United States Patent
Xue et al.

(10) Patent No.: US 11,737,095 B2
(45) Date of Patent: Aug. 22, 2023

(54) INDEX MODULATION-BASED HYBRID AUTOMATIC REPEAT REQUEST CODEBOOK OVER A SIDELINK FEEDBACK CHANNEL

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/350,517

(22) Filed: Jun. 17, 2021

(65) Prior Publication Data
US 2022/0408422 A1 Dec. 22, 2022

(51) Int. Cl.
*H04W 72/20* (2023.01)
*H04L 5/00* (2006.01)
*H04W 72/0453* (2023.01)

(52) U.S. Cl.
CPC ........... *H04W 72/20* (2023.01); *H04L 5/0055* (2013.01); *H04W 72/0453* (2013.01)

(58) Field of Classification Search
CPC . H04W 72/20; H04W 72/0453; H04W 92/18; H04L 5/0055; H04L 1/1861; H04L 1/1685
See application file for complete search history.

(56) References Cited

U.S. PATENT DOCUMENTS

| | | | |
|---|---|---|---|
| 2020/0305126 A1* | 9/2020 | Li | H04L 1/0027 |
| 2020/0351057 A1* | 11/2020 | Yeo | H04L 5/0087 |
| 2020/0374978 A1* | 11/2020 | Panteleev | H04W 88/04 |
| 2020/0403751 A1* | 12/2020 | Baldemair | H04L 5/0055 |
| 2021/0050950 A1* | 2/2021 | Zhou | H04L 1/1854 |

(Continued)

OTHER PUBLICATIONS

3GPP TSG RAN WG1 Meeting #96, R1-1901993, Athens, Greece, "Discussion on physical layer procedures in NR V2X", Feb. 25-Mar. 1, 2019 (Year: 2019).*

(Continued)

*Primary Examiner* — Sithu Ko
*Assistant Examiner* — Malick A Sohrab
(74) *Attorney, Agent, or Firm* — Norton Rose Fulbright LLP

(57) ABSTRACT

This disclosure provides systems, methods, and devices for wireless communication that support an index modulation (IM)-based acknowledgement codebook so use with sidelink feedback. In a first aspect, a first UE receives at least one sidelink transmission from a second UE with a sidelink control information (SCI) message that triggers least one IM-based feedback message codebook. The first UE may determine an IM-based feedback message sequence, determine, based on the feedback sequence, a resource for transmission of the IM-based feedback message, wherein a resource index corresponds to the determined feedback message sequence. The first UE may then transmit the IM-based feedback message codebook on the determined resource to the second UE over the sidelink. Other aspects and features are also claimed and described.

30 Claims, 11 Drawing Sheets

(56) References Cited

U.S. PATENT DOCUMENTS

| | | | | |
|---|---|---|---|---|
| 2021/0168762 A1* | 6/2021 | Huang | ................... | H04L 1/1854 |
| 2021/0297190 A1* | 9/2021 | Baldemair | ............ | H04L 1/1896 |
| 2022/0086803 A1* | 3/2022 | Li | ..................... | H04W 72/0446 |
| 2022/0109527 A1* | 4/2022 | Hwang | ................. | H04W 72/23 |
| 2022/0132471 A1* | 4/2022 | Hwang | ................. | H04L 1/1861 |
| 2022/0321308 A1* | 10/2022 | Yu | ......................... | H04L 5/0055 |
| 2022/0393837 A1* | 12/2022 | Yang | ..................... | H04W 76/14 |

OTHER PUBLICATIONS

3GPP TSG RAN WG1 #100bis-e, R1-200xxxx e-Meeting, "Text proposal for TS 38.212 related to [100b-e-NR-5G_V2X_NRSL-Mode-1-04]", Apr. 20-30, 2020 (Year: 2020).*

* cited by examiner

INDEX MODULATION-BASED HYBRID AUTOMATIC REPEAT REQUEST CODEBOOK OVER A SIDELINK FEEDBACK CHANNEL

TECHNICAL FIELD

Aspects of the present disclosure relate generally to wireless communication systems, and more particularly, to sidelink communications in fifth generation (5G) new radio (NR) operations. Some features may enable and provide improved communications, including an index modulation-based hybrid automatic repeat request (HARQ) codebook over a sidelink feedback channel.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a first user equipment (UE), at least one sidelink transmission over a plurality of sub-channels of a sidelink from a second UE, wherein at least one sidelink control information (SCI) message from the second UE indicates to the first UE to transmit at least one index modulation (IM)-based feedback message codebook for the at least one sidelink transmission over a physical sidelink feedback channel (PSFCH) resource, and wherein each sub-channel of the plurality of sub-channels is associated with at least one legacy PSFCH resource set, determining a feedback message sequence for the at least one IM-based feedback message codebook for the at least one sidelink transmission, wherein the feedback message sequence includes an acknowledgement (ACK) or non-ACK (NACK) for each of the at least one sidelink transmission, determining, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence, and transmitting the at least one IM-based feedback message codebook on the determined PSFCH resource to the second UE over the sidelink.

In an additional aspect of the disclosure, a method of wireless communication includes receiving, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE, wherein the feedback message codebook includes a feedback response for the at least one sidelink transmission, and wherein each PSFCH resource pool of the plurality of PSFCH resource pools is associated with a sub-channel in which a sidelink transmission of the at least one sidelink transmission is received from the second UE, determining, based on the indication in the at least one SCI message, a PSFCH resource from the plurality of PSFCH resource pools in which to transmit the feedback message codebook, and transmitting the feedback message codebook on the determined PSFCH resource to the second UE over the sidelink.

In an additional aspect of the disclosure, an apparatus configured for wireless communication is disclosed. The apparatus includes at least one processor, and a memory coupled to the processor. The processor is configured to receive, by a first UE, at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set, to determine a feedback message sequence for the at least one IM-based feedback message codebook for the at least one sidelink transmission, wherein the feedback message sequence includes an ACK or NACK for each of the at least one sidelink transmission, to determine, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence, and to transmit the at least one IM-based feedback message codebook on the determined PSFCH resource to the second UE over the sidelink.

In an additional aspect of the disclosure, an apparatus configured for wireless communication is disclosed. The apparatus includes at least one processor, and a memory coupled to the processor. The processor is configured to receive, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE, wherein the feedback message codebook includes a feedback response for the at least one sidelink transmission, and wherein each PSFCH resource pool of the plurality of PSFCH resource pools is associated with a sub-channel in which a sidelink transmission of the at least one sidelink transmission is received from the second UE, to determine, based on the indication in the at least one SCI message, a PSFCH resource from the plurality of PSFCH resource pools in which to transmit the feedback message codebook, and to transmit the feedback message codebook on the determined PSFCH resource to the second UE over the sidelink.

In an additional aspect of the disclosure, an apparatus configured for wireless communication includes means for receiving, by a first UE, at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set, means for determining a feedback message sequence for the at least one IM-based feedback message codebook for the at least one sidelink transmission, wherein the feedback message sequence includes an ACK or NACK for each of the at least one sidelink transmission, means for determining, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence, and means for transmitting the at least one IM-based feedback message codebook on the determined PSFCH resource to the second UE over the sidelink.

In an additional aspect of the disclosure, an apparatus configured for wireless communication includes means for receiving, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE, wherein the feedback message codebook includes a feedback response for the at least one sidelink transmission, and wherein each PSFCH resource pool of the plurality of PSFCH resource pools is associated with a sub-channel in which a sidelink transmission of the at least one sidelink transmission is received from the second UE, means for determining, based on the indication in the at least one SCI message, a PSFCH resource from the plurality of PSFCH resource pools in which to transmit the feedback message codebook, and means for transmitting the feedback message codebook on the determined PSFCH resource to the second UE over the sidelink.

In an additional aspect of the disclosure, a non-transitory computer-readable medium having program code recorded thereon. The program code further includes code to receive, by a first UE, at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set, code to determine a feedback message sequence for the at least one IM-based feedback message codebook for the at least one sidelink transmission, wherein the feedback message sequence includes an ACK or NACK for each of the at least one sidelink transmission, code to determine, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence, and code to transmit the at least one IM-based feedback message codebook on the determined PSFCH resource to the second UE over the sidelink.

In an additional aspect of the disclosure, a non-transitory computer-readable medium having program code recorded thereon. The program code further includes code to receive, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE, wherein the feedback message codebook includes a feedback response for the at least one sidelink transmission, and wherein each PSFCH resource pool of the plurality of PSFCH resource pools is associated with a sub-channel in which a sidelink transmission of the at least one sidelink transmission is received from the second UE, code to determine, based on the indication in the at least one SCI message, a PSFCH resource from the plurality of PSFCH resource pools in which to transmit the feedback message codebook, and code to transmit the feedback message codebook on the determined PSFCH resource to the second UE over the sidelink.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
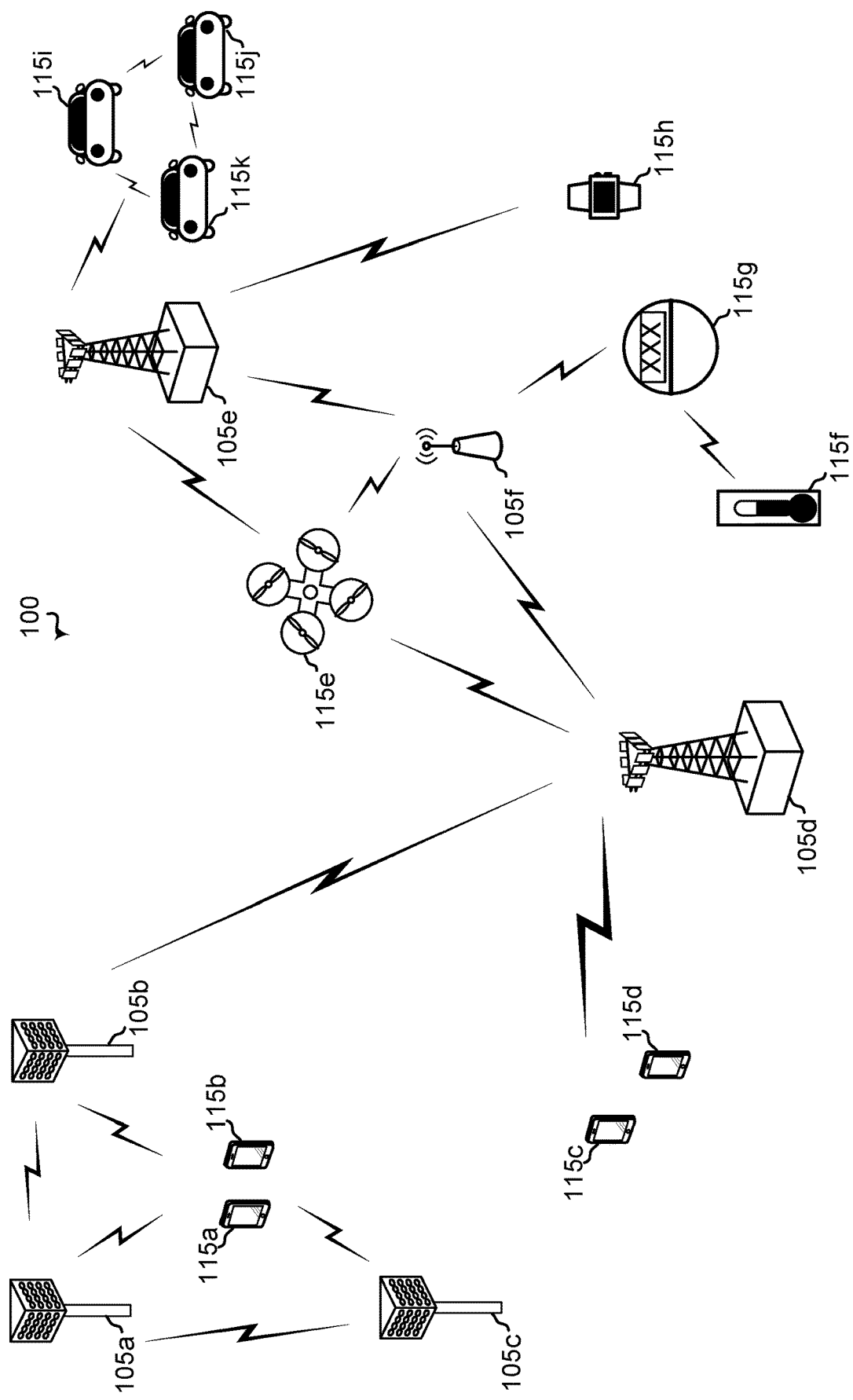
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support an index modulation (IM)-based hybrid automatic repeat request (HARQ) codebook over a sidelink feedback channel. According to various aspect, a first UE may receive at least one sidelink transmission from a second UE with a sidelink control information (SCI) message that triggers least one IM-based feedback message codebook. The first UE may determine an IM-based feedback message sequence, determine, based on the feedback sequence, a resource for transmission of the IM-based feedback message, wherein a resource index corresponds to the determined feedback message sequence. The first UE may then transmit the IM-based feedback message codebook on the determined resource to the second UE over the sidelink.

Particular implementations of the subject matter described in this disclosure may be implemented to realize one or more of the following potential advantages or benefits. In some aspects, the present disclosure provides techniques for IM-based HARQ codebook over a sidelink feedback channel. Such techniques allow for receiving sidelink UEs to transmit sidelink feedback for multiple sub-channels of transmitted information using a single sidelink feedback channel waveform without a power splitting impact on the feedback transmissions.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
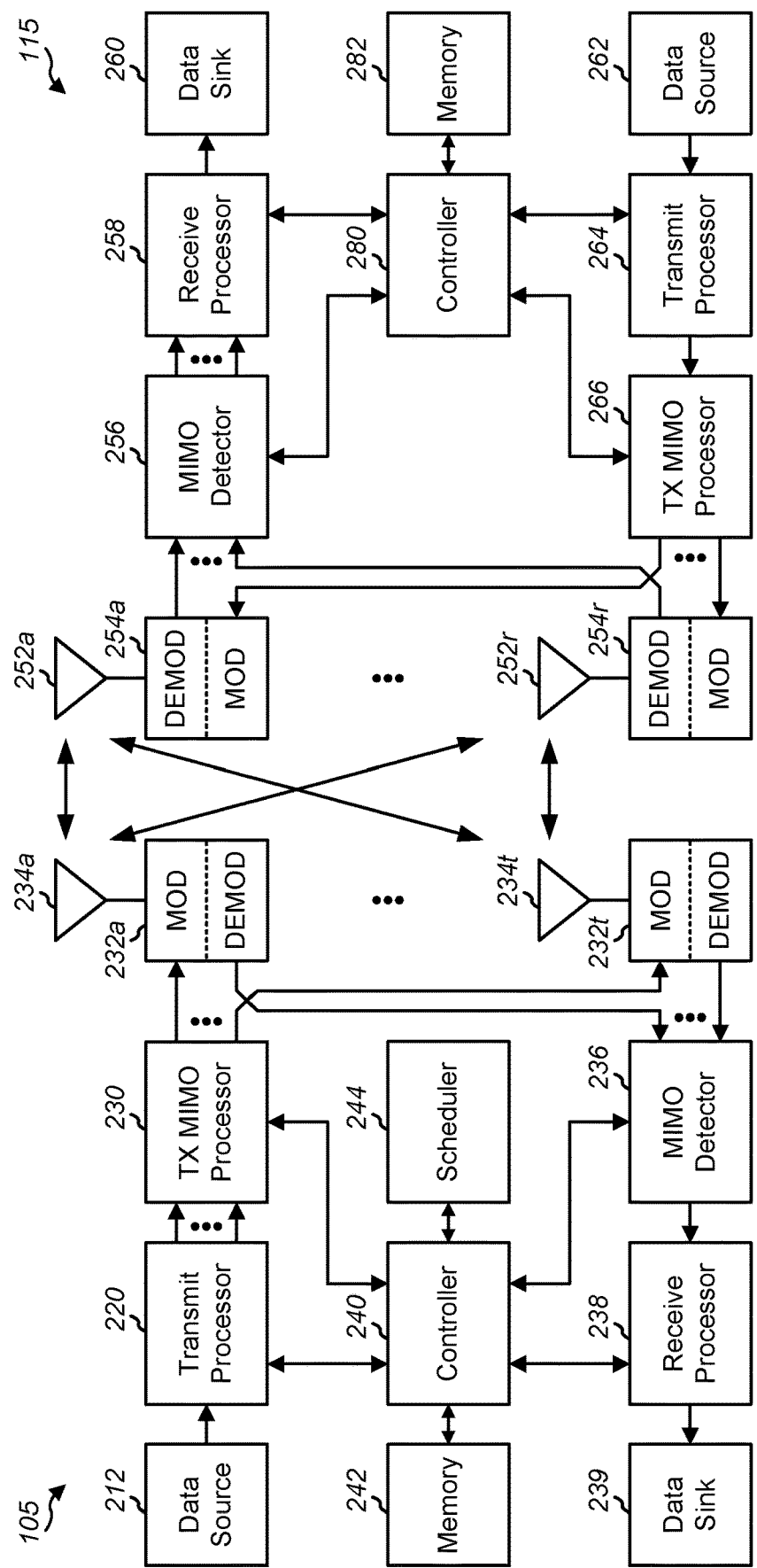
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-μs, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

New radio (NR) sidelink (SL) operations were at one time in 3GPP Release 16 (Rel-16) for the vehicle-to-everything (V2X) use case. This V2X use of NR SL was discussed to increase safety via peer-to-peer delivery of safety messages over intelligent transportation service (ITS) and other sub-6 GHz licensed bands. Such use would include a dynamic network topology frequently dominated by groupcast and broadcast traffic. Two resource allocation/channel access modes have been specified: a first mode (Mode 1), which was developed for in-coverage deployment, and a second mode (Mode 2), which was developed for out-of-coverage deployment. "In-coverage" may refer to an approach where a transmitting UE receives a grant from a serving base station for sidelink channel access, while "out-of-coverage" may refer to an approach where a sidelink UE may use autonomous sensing for channel access shared by nodes that may not be in the same operator service or radio access technology.

Each sidelink channel access may include a control channel and a shared data channel (e.g., physical sidelink control channel (PSCCH), physical sidelink shared channel (PSSCH), etc.) occupying at least one sub-channel to transmit one transport block (TB) of data. A sidelink control information (SCI) message may be transmitted to include the control information used by the receiver to receive and decode the TB. A regular TB data channel transmission may occupy one sub-channel, while a jumbo TB data transmission can occupy more than one sub-channels. A hybrid automatic repeat request (HARQ) procedure was adopted to improve the reliability of unicast and groupcast sidelink transmissions. In such sidelink HARQ procedure, the transmitting UE can request a HARQ response from a receiving UE by including a HARQ response request. After receiving the request, the receiving UE may send the HARQ response using a sidelink feedback channel, such as the physical sidelink feedback channel (PSFCH).

In a groupcast scenario, two options (option 1 and option 2) are supported for the sidelink HARQ feedback. For option 1, a receiving UE transmits a negative acknowledgement (NACK) if it has not successfully decoded the TB (after decoding the 1st-stage SCI) and, if its relative distance to the transmitting UE (referred as Tx-Rx distance) is less than or equal to the communication range (indicated in the 2nd-stage SCI). Otherwise, the receiving UE does not transmit any HARQ feedback. As the HARQ feedback for this option consists of NACK, option 1 is often referred to as the NACK-only feedback. Option 2 for groupcast HARQ feedback supports the acknowledgement (ACK)/NACK feedback from all receiving UEs. A receiving UE may send an ACK if it has successfully decoded the TB or may send a NACK if it has not decoded the TB, after decoding the 1st-stage SCI. For unicast or any of the groupcast options, a receiving UE will not send a reply if the receiving UE does not decode the 1st-stage SCI.

With option 1, the receiving UEs of a transmission share a resource for sending their NACK-only feedback, while with option 2 each receiving UE sends its ACK/NACK feedback on a separate resource. Thus, with option 1, a transmitting UE cannot generally identify which receiving UEs sent a NACK. If a transmitting UE receives at least one NACK with option 1, it becomes aware that at least one receiving UE within the communication range did not correctly decode the transmission. In addition, if a transmitting UE receives no reply with option 1, it would not be able to distinguish whether the receiving UEs within the communication range have successfully received the transmission or if some have not successfully decoded the corresponding 1'-stage SCI. In contrast, a transmitting UE can distinguish the HARQ feedback of the receiving UEs with option 2. This would enable the transmitting UE to perform a retransmission tailored to specific RX UE(s). With option 2, if a transmitting UE receives no reply on the feedback resource corresponding to a given receiving UE, it becomes aware that the receiving UE has not successfully decoded the corresponding 1'-stage SCI. Consequently, option 2 enables a higher reliability for the transmissions. The above advantages of option 2 over option 1, however, come at the expense of more resources for the groupcast HARQ feedback. In NR V2X, the use of HARQ feedback and the choice whether to use option 1 or option 2 for groupcast HARQ feedback is up to UE implementation.

Each Z sub-channels or data channels (e.g., PSSCHs) of data transmission from the transmitting UE to the receiving UE may be mapped to Z-physical resource blocks (PRBs), which can carry up to Z*Y feedback channel resources for the receiving UE, where Y corresponds to an integer within the set {1,2,3,4,6}, representing the number of cyclic shifts. The cyclic shift represents the dimension in the code domain. The receiving UE may then select the feedback channel resource corresponding to the index, (K+M)mod (Z*Y), for transmitting over one of the Z-PRB corresponding to the leading subchannel of the data channel (e.g., PSSCH), where K represents a multi-bit layer 1 (L1) source identifier (ID), and M represents the member ID for groupcast HARQ response. The physical layer specifications may assume that the member ID is within {0, 1, . . . X−1}, while the option 2 groupcast HARQ feedback (i.e., respective response for different receivers) is not used for X>(Z*Y). Otherwise, A may be set to 0 (e.g., M=0).

NR sidelink capabilities and operations have been suggested for application to various new, different vertical domains, outside of V2X applications. However, not every vertical domain has access to the sub-6 GHz licensed band. Vertical domains that do have access to sub-6 GHz licensed band may further be seeking opportunities in unlicensed bands. Currently, there is approximately 1.8 GHz of bandwidth available in the 5 GHz/6 GHz unlicensed band and approximately 7 GHz of bandwidth available in the 60 GHz unlicensed band. Such wider bandwidths may create significantly different deployment scenarios or use cases than those considered in 3GPP Release 16 (Rel-16) and Release 17 (Rel-17), assuming limited bandwidth within the licensed spectrum. Enhanced mobile broadband (eMBB)-like bursty traffic may dominate some of these new use cases. Arrival of a data burst may push sidelink UEs to transmit over multiple sub-channels in the same slot or over a few contiguous slots.

Figure 3A:
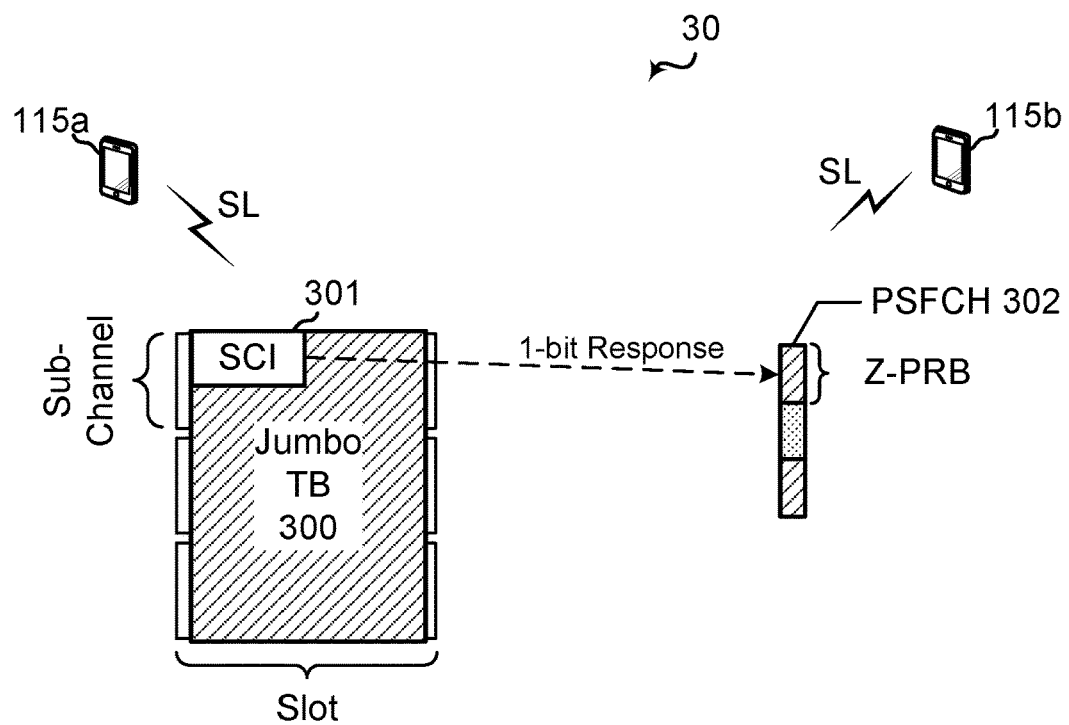
FIGS. 3A-3D are block diagrams illustrating example wireless communication systems that support an index modulation-based hybrid automatic repeat request (HARQ) codebook over a sidelink feedback channel according to one or more aspects.
Figure 3B:
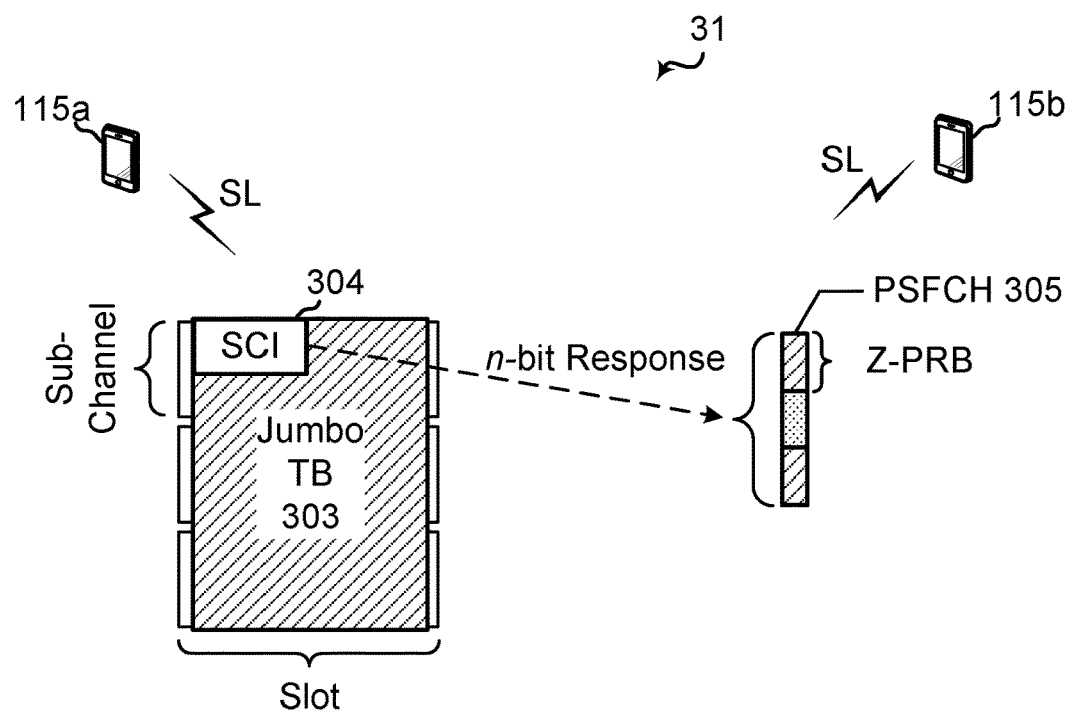

FIGS. 3A-3D are block diagrams communication networks 30-33 illustrating feedback operations associated with sidelink burst transmissions over multiple sub-channels. UEs 115a and 115b, as illustrated in FIGS. 3A-3D, are within a communication range of each other and engage in sidelink communications. As illustrated in FIGS. 3A and 3B, the arrival of a data burst at UE 115a can lead to transmission of jumbo TBs 300 and 303 over multiple sub-channels. As shown, jumbo TBs 300 and 303 are transmitted in a single slot spanning three sub-channels. SCIs 301 and 304 within jumbo TBs 300 and 303, respectively, includes a request for UE 115b to respond with HARQ feedback. FIG. 3A corresponds to a Rel-16 operation that defines a 1-bit HARQ response that does not include codeblock group (CBG) capabilities. Failure to include CBG-based feedback may be a result of an application to V2X use cases, where transmission of such jumbo may be rare. UE 115b may include the 1-bit HARQ response in a feedback channel, such as PSFCH 302, including Z-PRB.

Jumbo TBs, such as jumbo TB 303, may be more frequently used for carrying eMBB-like traffic. Accordingly, as illustrated in FIG. 3B, CBG-based feedback may be defined. In such a CBG-enabled scenario, a multiple bit HARQ response, n bits, may be included within the feedback channel, PSFCH 305. As illustrated, with jumbo TB 303 covering three sub-channels, UE 115b transmits a 3-bit feedback response to UE 115a in PSFCH 305.

Figure 3C:
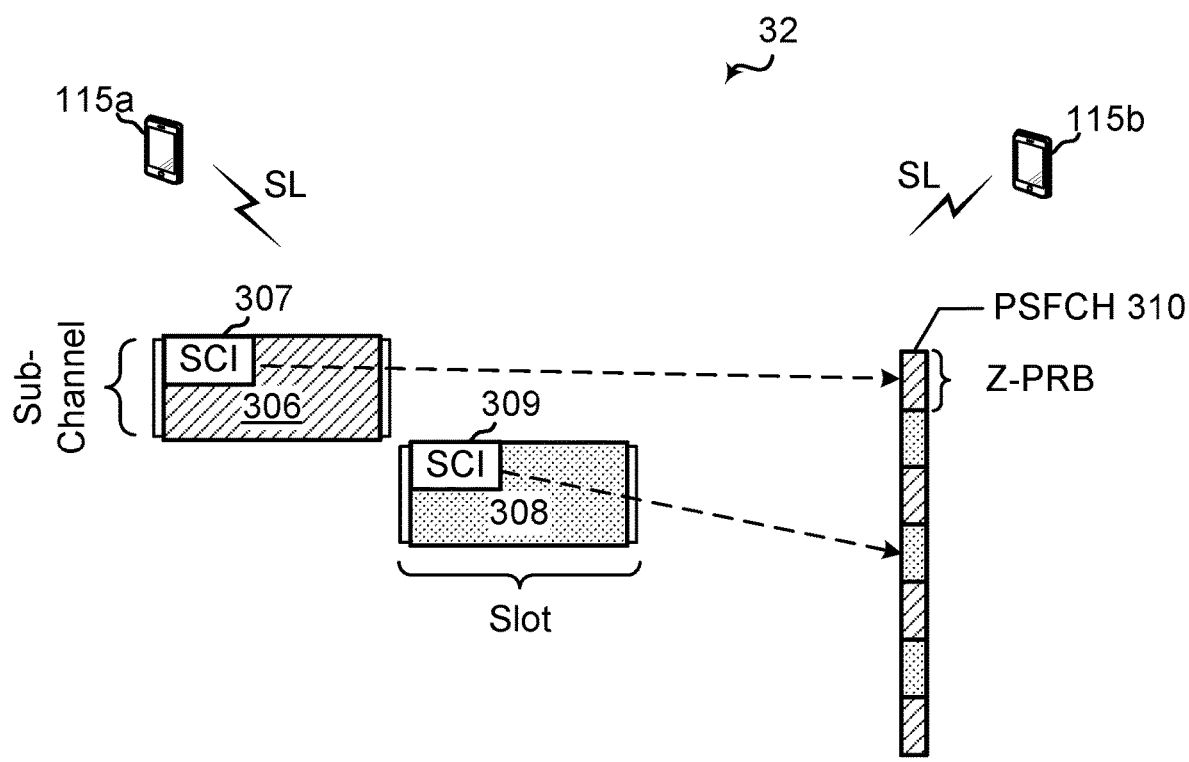

UE 115a may further transmit sidelink bursts over multiple sub-channels in different slots. As illustrated in FIG. 3C, UE 115a transmits sidelink burst over data channels 306 and 308 in different slots. When such data channels 306 and 308 are transmitted periodically, such as every N>1 slots, HARQ feedback from UE 115b may be scheduled for the same feedback channel occasion. SCIs 307 and 309 request UE 115b to transmit feedback at the feedback channel, PSFCH 310, which are transmitted by UE 115a at corresponding Z-PRB of PSFCH 310.

Figure 3D:
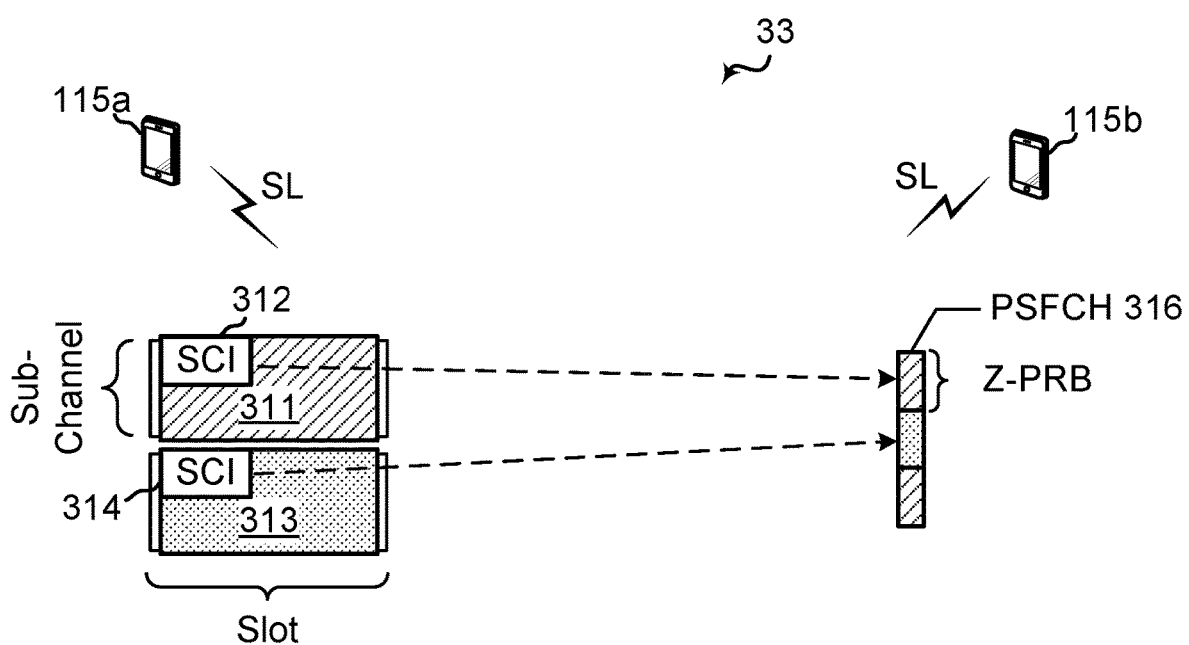

UE 115a may further transmit sidelink bursts over multiple sub-channel in the same slot. As illustrated in FIG. 3D, UE 115a transmits sidelink burst over data channels 311 and 313 in the same slot. Power splitting may be employed in which transmit power may be split among concurrent data channels (e.g., data channels 311 and 313), where m concurrent data channels can request n m HARQ feedback during the same feedback channel instant, such as PSFCH 316. Concurrent transmission of multiple TBs over multiple data channels in the same slot may be allowed under current standards. For example, a Mode 2 sidelink UE can operate in parallel with independent channel sensing for multiple TBs.

HARQ codebook designs over sidelink feedback channels have been proposed. In one such proposal, a one-bit trigger may be inserted in the SCI message to trigger Type-3 HARQ feedback. Such Type-3 feedback may be transmitted over a dedicated sidelink feedback channel resource pool. The Type-3 HARQ codebook was developed in NR-U operations to handle listen before talk (LBT) uncertainty. This type of feedback may be useful when channel access to the sidelink feedback channel can be blocked by a failed LBT procedure. Another proposal has suggested a HARQ codebook design assuming a multiple bit sidelink feedback channel. Specifically, it has been proposed to use the PUCCH format 2 waveform as the baseline to develop the multi-bit sidelink feedback channel. Another proposal has suggested development of a PUCCH resource indication (PRI)-like signaling in an SCI message to indicate how the HARQ codebook can be built.

Further proposals have applied index modulation (IM) to deliver multiple control bits over the pool of sidelink feedback resources allocated to one sub-channel in the legacy framework. A legacy sidelink feedback channel (e.g., PSFCH) may carry one bit, in which the resource index may be determined using a pre-configured hashing function. The index of the selected sidelink feedback channel resource does not carry any information, though, in practice, a relatively large hashing space (e.g., Z*Y) may be configured to facilitate the option 2 groupcast HARQ feedback, as well as to suppress sidelink feedback channel collision. It has such been proposed to apply a two-dimensional (e.g., frequency domain via PRB index and code domain via CS index) IM to deliver $n_0>1$ (e.g., $n_0=3$ with Z=2) control bits. A receiving UE may transmit at a sidelink feedback channel resource whose index is pre-mapped to a no-bit control sequence. It should be noted that encoding and detection/decoding can be conducted under the legacy sidelink feedback channel framework. Various aspects of the present disclosure provide for an index modulation-based HARQ codebook over a sidelink feedback channel.

Figure 4:
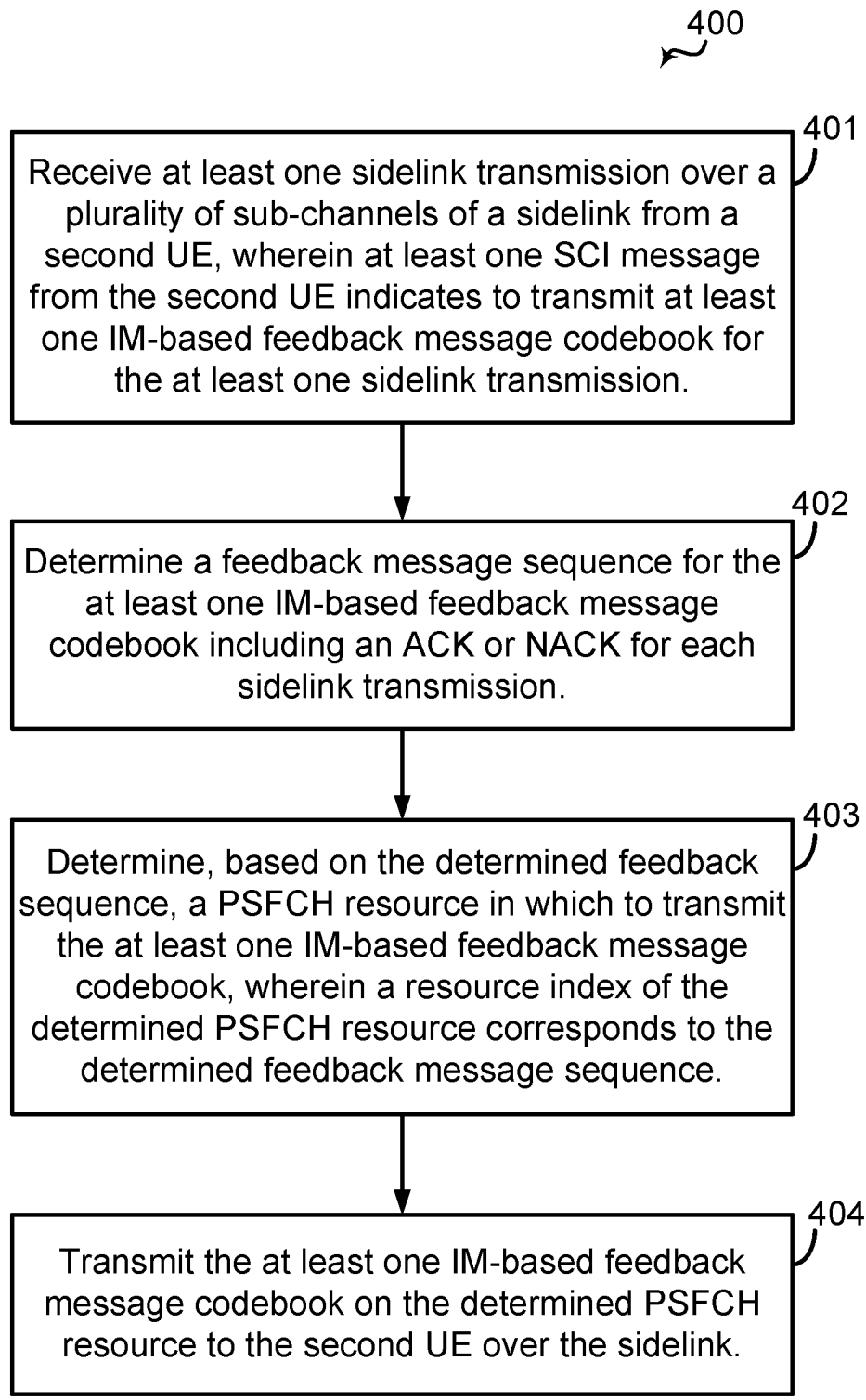
FIG. 4 is a flow diagram illustrating an example process that supports an IM-based HARQ codebook over a sidelink feedback channel according to one or more aspects.
Figure 11:
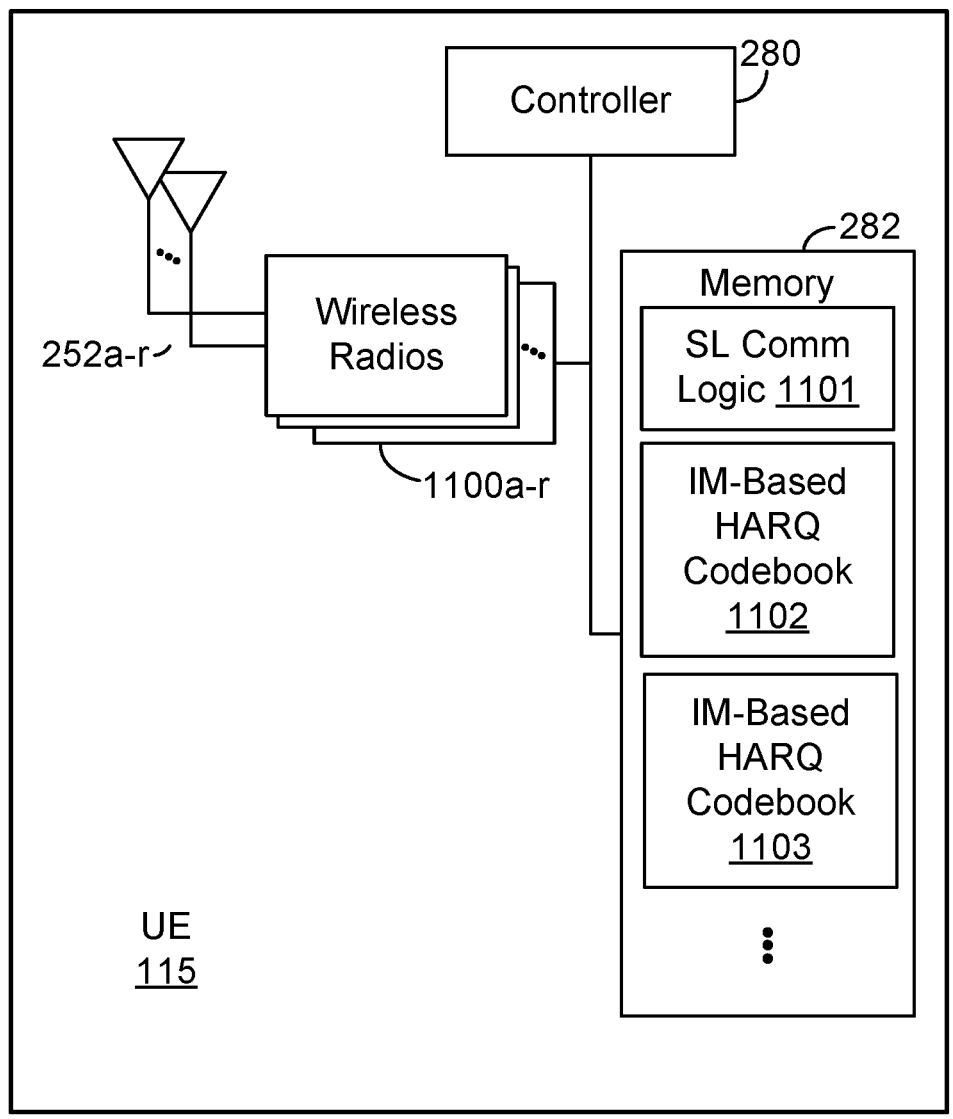
FIG. 11 is a block diagram of an example UE that supports an IM-based HARQ codebook over a sidelink feedback channel according to one or more aspects.

FIG. 4 is a flow diagram illustrating an example process 400 that supports an index modulation (IM)-based HARQ codebook over a sidelink feedback channel according to one or more aspects. Operations of process 400 may be performed by a UE, such as UE 115 described above with reference to FIGS. 1, 2, 3, or a UE described with reference to FIG. 11. FIG. 11 is a block diagram of an example UE 115 that supports an IM-based HARQ codebook over a sidelink feedback channel according to one or more aspects. For example, example operations (also referred to as "blocks") of process 400 may enable UE 115 to support an IM-based HARQ codebook over a sidelink feedback channel. UE 115 may be configured to perform operations, including the blocks of a process described with reference to FIG. 4. In some implementations, UE 115 includes the structure, hardware, and components shown and described with reference to UE 115 of FIGS. 1-3. For example, UE 115 includes controller 280, which operates to execute logic or computer instructions stored in memory 282, as well as controlling the components of UE 500 that provide the features and functionality of UE 115. UE 115, under control of controller 280, transmits and receives signals via wireless radios 1100a-r and antennas 252a-r. Wireless radios 1100a-r include various components and hardware, as illustrated in FIG. 2 for UE 115, including modulator and demodulators 254a-r, MIMO detector 256, receive processor 258, transmit processor 264, and TX MIMO processor 266. As shown, memory 282 may include sidelink (SL) communication logic 1101, IM-based HARQ codebook logic 1102, and SL feedback resource set 1103. UE 115 may send and receive sidelink transmission signals to or from one or more neighboring UEs, such as UE 115b of FIGS. 1-3.

In block 401, the UE receives at least one sidelink transmission over a plurality of sub-channels of a sidelink from a second UE, wherein at least one SCI message from the second UE indicates to the first UE to transmit at least one IM-based feedback message codebook for the at least one sidelink transmission over a sidelink feedback channel resource, and wherein each sub-channel is associated with at least one legacy sidelink feedback channel resource set. A sidelink compatible UE, such as UE 115, may, under control of controller/processor 280, execute SL communication logic 1101, stored in memory 282. The execution of the instructions and code of SL communication logic 1101 by controller/processor 280 (referred to herein as the "execution environment" of SL communication logic 1101) enables the features and functionality of sidelink communications by UE 115. Within the execution environment of SL communication logic 1101, UE 115 may receive signals via antennas 252a-r and wireless radios 1100a-r which it decodes and interprets at sidelink communications from one or more neighboring UEs. The received sidelink transmission includes an SCI message from the other neighboring UE that triggers feedback using an IM-based feedback message codebook.

The requested feedback will be transmitted using a sidelink feedback channel resource from a legacy sidelink feedback channel resource set, where each sub-channel is associated with at least one legacy sidelink feedback channel resource set. UE 115 would maintain information on the legacy sidelink feedback channel resource sets at SL feedback resource set 1103, stored in memory 282.

Considering that a first UE, UE 115, is receiving over m>1 sub-channels from a second UE and is asked for HARQ responses with respect to n>1 data segments protected by cyclic redundancy check (CRC). Per Rel-16, the first UE (UE 115) can transmit m sidelink feedback channels (e.g., PSFCHs), each of which may be selected from a dedicated set of (Z*Y) feedback resources, when m does not exceed its capability. However, Rel-16 has adopted power splitting and the HARQ codebook size may be limited to n≤m. According to the aspects described herein, UE 115 may transmit an IM-based HARQ codebook. As a single sidelink feedback channel waveform is transmitted, no power splitting will impact the sidelink feedback transmission. With the index-modulation based multiple bit sidelink feedback channel, the relationship between n and m can be relaxed to the relationship:

$$n \leq 2 + \lfloor \log_2(m*Z) \rfloor. \tag{1}$$

It should be noted that, there would be a capacity advantage of IM when m is relatively small. It is well understood that IM may not be efficient for high data rates due to a lower occupancy of the radio resource. In deriving formula (1) of $n \leq 2 + \lfloor \log_2(m*Z) \rfloor$, use of the cyclic shift (CS) optimization on a PUCCH format 0 has been assumed.

In block 402, the UE determines a feedback message sequence for the at least one IM-based feedback message codebook for the at least one sidelink transmission, wherein the feedback message sequence includes ACK or NACK for each of the at least one sidelink transmission. As UE 115 receives the sidelink transmissions, it may either successfully or unsuccessfully decode the received transmission, under control of controller/processor 280. The particular feedback message sequence identifies the IM-based feedback message codebook from IM-based HARQ codebook 1102.

In block 403, the UE determines, based on the determined feedback sequence, a sidelink feedback channel resource from the at least one legacy sidelink feedback channel resource set associated with each sub-channel of the plurality of sub-channels in which to transmit the at least one IM-based feedback message codebook, wherein a resource index of the determined sidelink feedback channel resource corresponds to the determined feedback message sequence. UE 115 may determine a plurality of sub-channels in which to transmit the IM-based feedback message and identifies the legacy sidelink feedback channel resource sets from SL feedback resource set 1103 based on the sub-channels for the feedback.

In block 404, the UE transmits the at least one IM-based feedback message codebook on the determined PSFCH resource to the second UE over the sidelink. UE 115 may then transmit the IM-based HARQ feedback message codebook to the neighboring UE via wireless radios 1100a-r and antennas 252a-r.

As described with reference to FIG. 4, the present disclosure provides techniques for an IM-based HARQ codebook over a sidelink feedback channel. Such techniques allow for receiving sidelink UEs to transmit sidelink feedback for multiple sub-channels of transmitted information using a single sidelink feedback channel waveform without a power splitting impact on the feedback transmissions.

Figure 5:
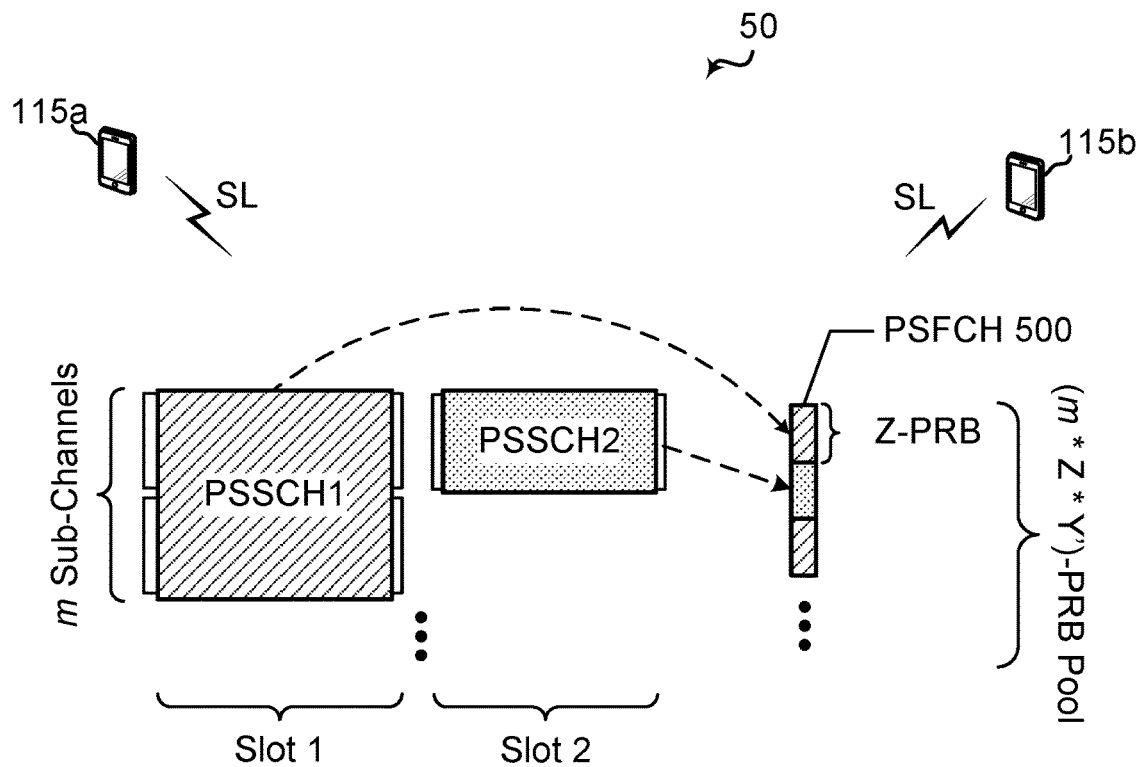
FIG. 5 is a block diagram illustrating a wireless communication network with UEs configured for providing an IM-based HARQ codebook over a sidelink feedback channel according to aspects of the present disclosure.

FIG. 5 is a block diagram illustrating wireless communication network 50 with UEs 115a and 115b configured for providing an IM-based HARQ codebook over a sidelink feedback channel according to aspects of the present disclosure. A first NR sidelink UE, UE 115b, can be indicated to transmit an n(≥1)-bit IM based HARQ codebook to the second NR sidelink UE, UE 115a, over m(≥1) pools of sidelink feedback channel resources assigned per legacy capabilities to the occupied m sub-channels. Legacy capabilities define a pool of sidelink feedback channel resources occupying Z-PRB for sending HARQ responses with respect to the sidelink data transmissions from UE 115a that occupy multiple sub-channels (m subchannels). As illustrated, UE 115a send sidelink transmissions in PSSCH1 and PSSCH2 occupying multiple, m, sub-channels and multiple slots (slot 1 and slot 2). UE 115b can be indicated to transmit a legacy sidelink feedback channel waveform over one of the (m*Z*Y') resources and use its resource index to carry the HARQ codebook (Table 1) towards n ≥1 data segments protected by CRC(s), where Y' is the number of cyclic shifts (CSs) per PRB.

TABLE 1

| Mod(m * Z * Y') | HARQ Codebook |
|---|---|
| 0 | "NACK, NACK, . . . , NACK, NACK" |
| 1 | "NACK, NACK, . . . , NACK, ACK" |
| . . . | . . . |
| m * Z * Y' – 1 | "ACK, ACK, . . . ACK, ACK" |

In operation according to the present aspect, UE 115a transmits a sidelink data burst to UE 115b via multiple sub-channels and multiple slots in PSSCH1 and PSSCH2. An SCI (not shown) in each of PSSCH1 and PSSCH2 may indicate to UE 115b to transmit an IM-based HARQ response, as selected from Table 1, and identify to UE 115b to select a sidelink feedback resource from the (m*Z*Y) feedback channel resource pool. Based on the success or failure to decode the transmitted sidelink data, UE 115b will select a corresponding IM-based HARQ response from Table 1, select the Z-PRB of the (m*Z*Y') feedback channel resource pool, and transmit the HARQ response in PSFCH 500.

Figure 6:
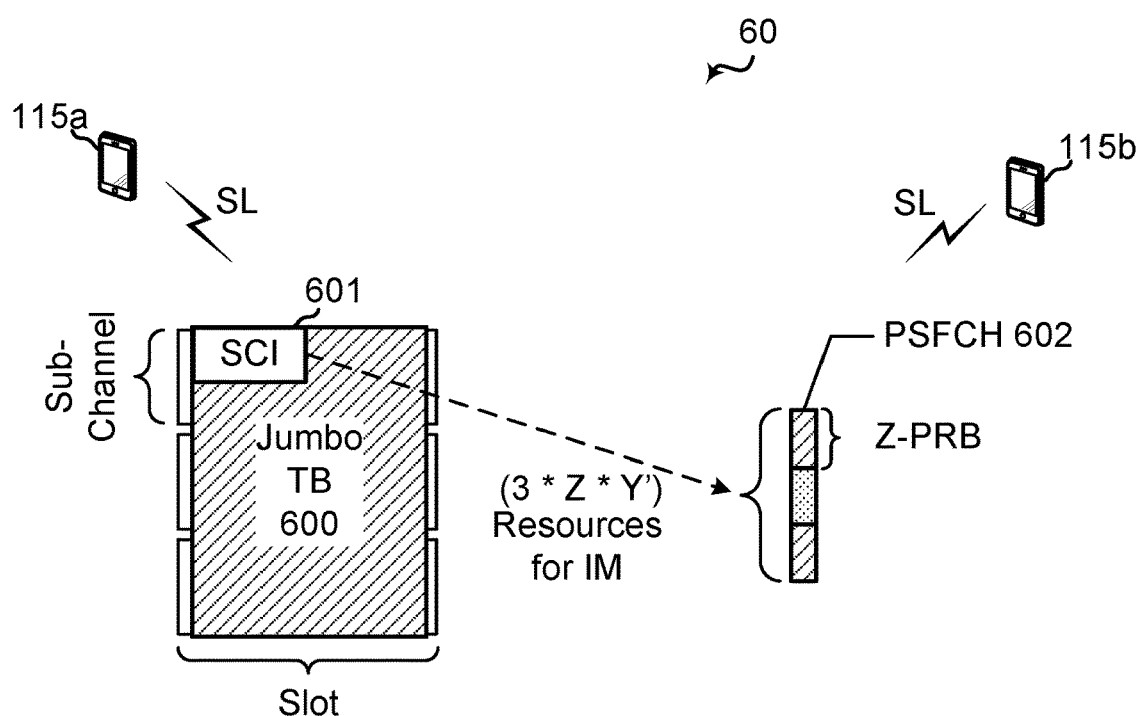
FIG. 6 is a block diagram illustrating a wireless communication network with UEs configured for providing an IM-based HARQ codebook over a sidelink feedback channel according to aspects of the present disclosure.

FIG. 6 is a block diagram illustrating wireless communication network 60 with UEs 115a and 115b configured for providing an IM-based HARQ codebook over a sidelink feedback channel according to aspects of the present disclosure. UE 115a transmits a larger data burst via a sidelink transmission to UE 115b using jumbo transport block (TB) 600. Within jumbo TB 600, UE 115a includes SCI 601 which includes a request to UE 115b for an IM-based HARQ codebook response over m sub-channels.

As illustrated, jumbo TB 600 spans three (3) sub-channels. The legacy feedback operation specifies a one-bit response for jumbo TB 600. The illustrated aspect for providing an IM-based HARQ codebook may be implemented using the one-bit response defined in the legacy configuration. Where SCI 601 carries one bit to request UE 115b for an IM based HARQ codebook, the additional configurations for UE 115b to respond with the IM-based HARQ codebook by using additional configurations, such as the value of n and the mapping of codeblocks (CBs) to an IM-based HARQ response have been communicated an agreed upon over higher layer (layer 3/layer 2) signaling. Further, m may be implicitly signaled in the frequency domain resource assignment (FDRA) of the sidelink data transmission. With the information related to the number of data segments, n, the number of sub-channels/resources for sidelink feedback, and the CB mapping provided in such accompanying signaling, UE 115b may provide the selected IM-based HARQ response via PSFCH 602.

Figure 7:
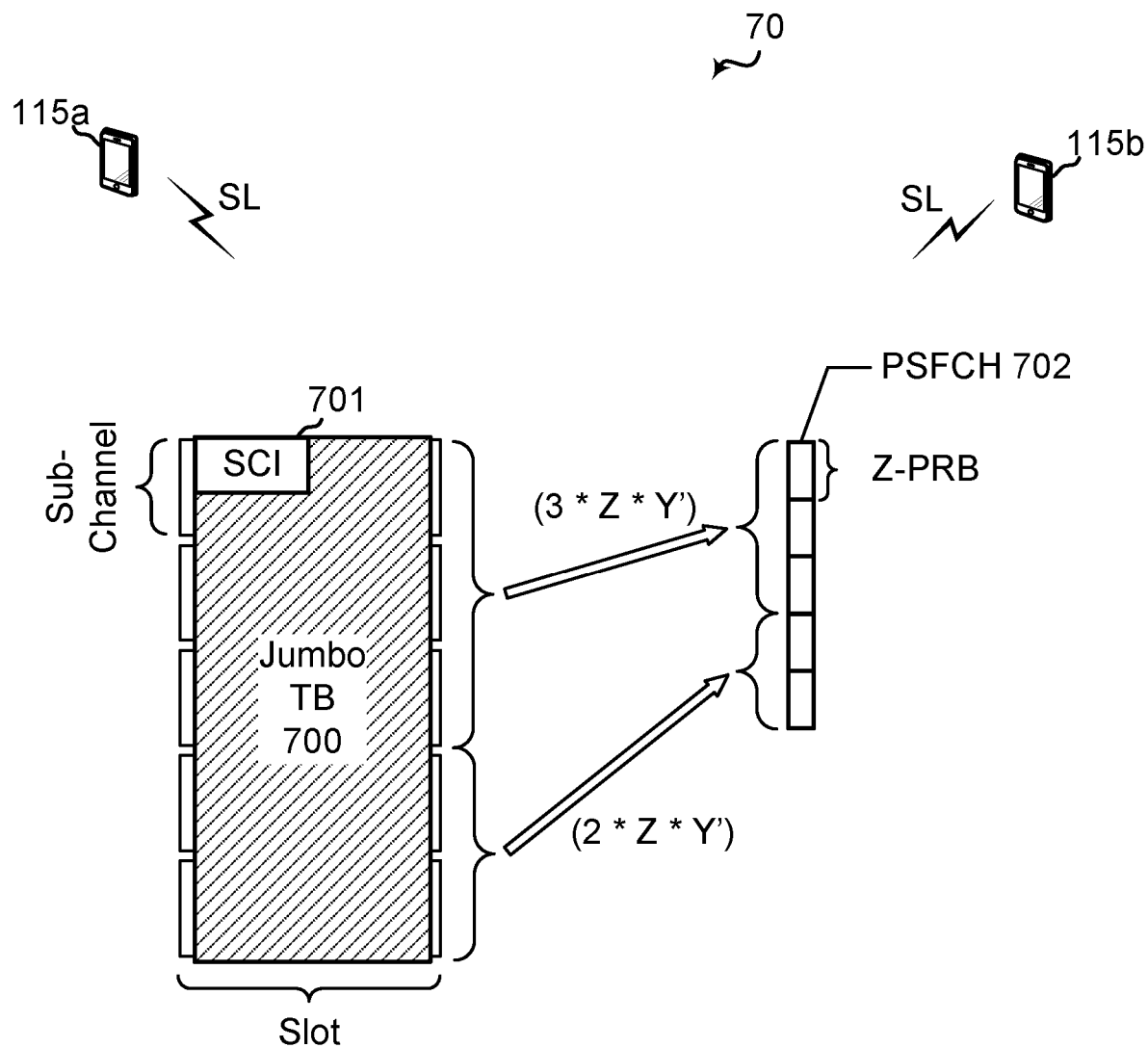
FIG. 7 is a block diagram of an example UE that supports an index modulation-based HARQ codebook over a sidelink feedback channel according to one or more aspects.

FIG. 7 is a block diagram illustrating wireless communication network 70 with UEs 115a and 115b configured for providing an IM-based HARQ codebook over a sidelink feedback channel according to aspects of the present disclosure. UE 115a transmits a large data burst via a sidelink transmission to UE 115b using jumbo TB 700. Within jumbo TB 600, UE 115a includes SCI 601 which includes a request to UE 115b for an IM-based HARQ codebook response over m sub-channels. As the number of sub-channels, m, increases to transmit jumbo TB 700, UE 115b may be indicated to transmit multiple IM-based HARQ codebooks. As noted above, as m increases relative to the number of data segments, n, the capacity advantage of IM for low m values begins to flatten. Accordingly, higher layer signaling (layer 3/layer 2 signaling) may define a maximum number for m when building an IM-based HARQ codebook.

For example, signaling between UE 115a and UE 115b set a maximum m at 3. With jumbo TB 700 covering five sub-channels, UE 115b may build two separate IM-based HARQ codebooks. A first IM-based HARQ codebook based on the maximum, m=3, in which UE 115b would select a feedback resource (Z-PRB) for PSFCH 702 for the first IM-based HARQ codebook over a pool of (3*Z*Y') feedback resources, and a second IM-based HARQ codebook based on the remaining sub-channels, m=2, in which UE 115b would select a feedback resource (Z-PRB) for PSFCH 702 for the second IM-based HARQ codebook over a pool of (2*Z*Y) feedback resources.

Figure 8A:
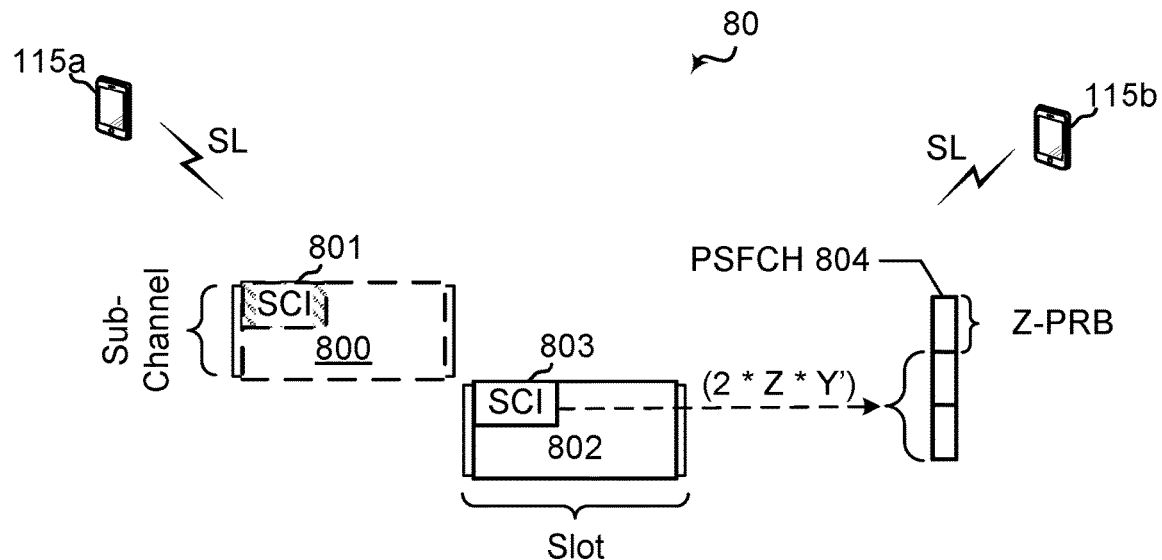
FIGS. 8A and 8B are block diagrams illustrating wireless communication networks with UEs configured for providing an IM-based HARQ codebook over a sidelink feedback channel according to aspects of the present disclosure.
Figure 8B:
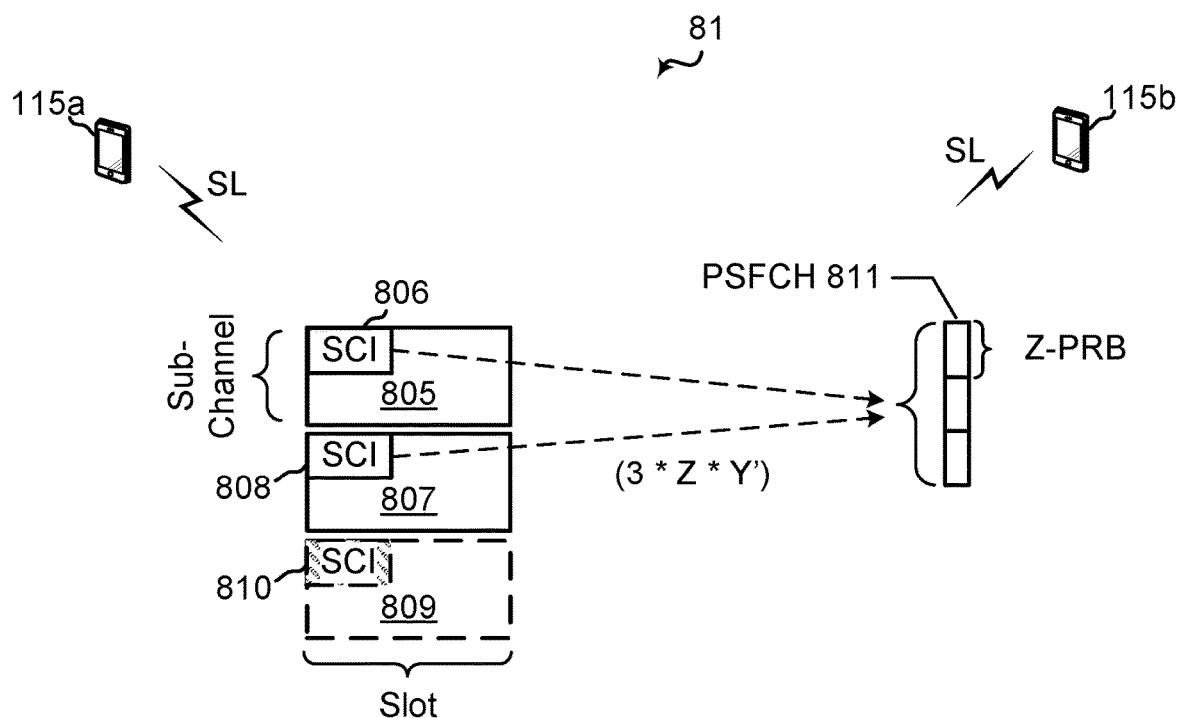

FIGS. 8A and 8B are block diagrams illustrating wireless communication networks 80 and 81 with UEs 115a and 115b configured for providing an IM-based HARQ codebook over a sidelink feedback channel according to aspects of the present disclosure. UE 115a may transmit a sidelink data burst in multiple sub-channels using separate data channels over different slots (data channels 800 and 802 of FIG. 8A) or over the same slot (data channels 805, 807, and 809 of FIG. 8B). For any variety of reasons, UE 115b fails to receive the transmissions of data channel 800 (FIG. 8A) and data channel 809 (FIG. 8B). UE 115b may receive an indication from multiple SCIs (SCI 803 of FIG. 8A and SCIs 806 and 808 of FIG. 8B, SCIs 801 and 810 were not successfully decoded) requesting an TM-based HARQ codebook response for multiple data channels (data channel 802 of FIG. 8A and data channels 805 and 807 of FIG. 8B) transmitted by UE 115a using m sub-channels (two sub-channels in FIG. 8A and three sub-channels in FIG. 8B). The multiple SCIs (SCI 803 of FIG. 8A and SCIs 806 and 808 of FIG. 8B) point to a pool of sidelink feedback channel resources (the Z-PRB of PSFCH 804 in FIG. 8A and of PSFCH 811 in FIG. 8B) for building the IM-based HARQ codebook. Each SCI requests one-bit HARQ response. The pool of PSFCH resources identified in PSFCH 804 (FIG. 8A) or PSFCH 811 (FIG. 8B) can be the union of sidelink feedback resources assigned to the m sub-channels per legacy one-bit response request.

In an additional aspect providing IM-based HARQ codebook over a sidelink feedback channel according to aspects of the present disclosure, UE 115b, as illustrated in FIG. 8A, may be indicated to report a semi-static IM-based HARQ codebook. When sidelink feedback resources are configured over a period of N slots, UE 115b may report at each sidelink feedback instant, such as PSFCH 804, an IM-based HARQ codebook with size of N regardless of the total number of sidelink transmissions (e.g., PSSCHs) it has received. Assuming one TB per slot, UE 115b may use the pool of sidelink feedback resources indicated in the last received SCI to transmit the IM-based HARQ codebook. SCI 803 may point to multiple legacy PSFCH pools corresponding to the sub-channels that the second UE has occupied so far. While UE 115b fails to successfully decode data channel 800 and SCI 301, the period, N, of sidelink feedback resources is N=2. Thus, UE 115b may send the IM-based HARQ codebook reporting a NACK or discontinuous transmission (DTX), depending on the configuration of UE 115b, for the unsuccessfully received transmission of data channel 800 and SCI 801, and an ACK or NACK corresponding to the decoding state of data channel 802 and SCI 803.

Figure 9:
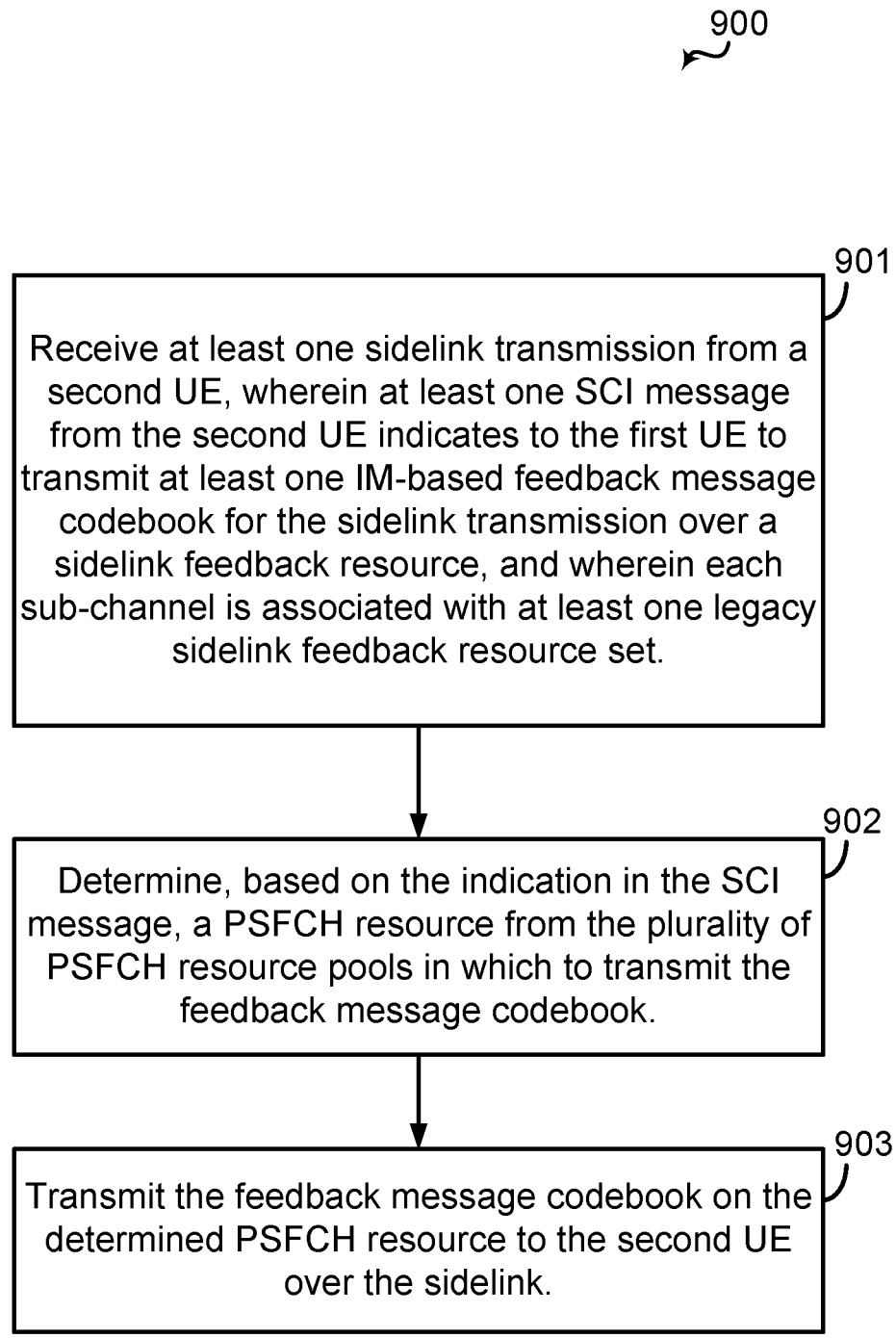
FIG. 9 is a flow diagram illustrating an example process 900 that supports an index modulation-based HARQ codebook over a sidelink feedback channel according to one or more aspects.

FIG. 9 is a flow diagram illustrating an example process 900 that supports an index modulation-based HARQ codebook over a sidelink feedback channel according to one or more aspects. Operations of process 900 may be performed by a UE, such as UE 115 described above with reference to FIG. 1-3 or 11. For example, example operations of process 900 may enable UE 115 to support an index modulation-based HARQ codebook over a sidelink feedback channel.

At block 901, the UE receives at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set. A sidelink compatible UE, such as UE 115, may, under control of controller/processor 280, execute SL communication logic 1101, stored in memory 282. Within the execution environment of SL communication logic 1101, UE 115 may receive an SCI message via antennas 252a-r and wireless radios 1100a-r from one or more neighboring UEs. The SCI message includes an indication of feedback resource pools for transmitting the feedback message codebook. UE 115 maintains information on the legacy sidelink feedback channel resource sets at SL feedback resource set 1103, stored in memory 282.

At block 902, the UE determines, based on the indication in the at least one SCI message, a PSFCH resource from the plurality of PSFCH resource pools in which to transmit the feedback message codebook. UE 115 may use the indication received in the SCI message to determine the resource for the feedback message codebook from the multiple feedback resource pools stored in SL feedback resource set 1103.

At block 903, the UE transmits the feedback message codebook on the determined PSFCH resource to the second UE over the sidelink. UE 115 determines the feedback response message based on the success or failure of decoding the received sidelink transmission. UE 115 may then transmit the feedback response message via wireless radios 1100a-r and antennas 252a-r to the neighboring UE.

With reference to FIG. 8B, for the concurrent PSSCHs as shown below, UE 115b can be indicated to transmit a HARQ codebook response. Each successfully decoded SCI, such as SCI 806 and 808, may include a codepoint that indicates how many sidelink data channels are concurrent in the present slot, as well as the index of the current sub-channel within the composite FDRA of the sidelink transmission bursts. From the composite FDRA within sidelink transmissions of data channels 805 and 807, UE 115b can learn the pool of sidelink feedback resources for the HARQ codebook. As illustrated in FIG. 8B, UE 115b will send the HARQ codebook response corresponding to the successfully decoded SCIs, SCIs 806 and 808, and the unsuccessfully decoded SCI, SCI 810. UE 115b will know the lost SCI, SCI 810, from the pool of sidelink feedback resources indicated by the decoded SCI (e.g., SCI 806 or 808).

Figure 10:
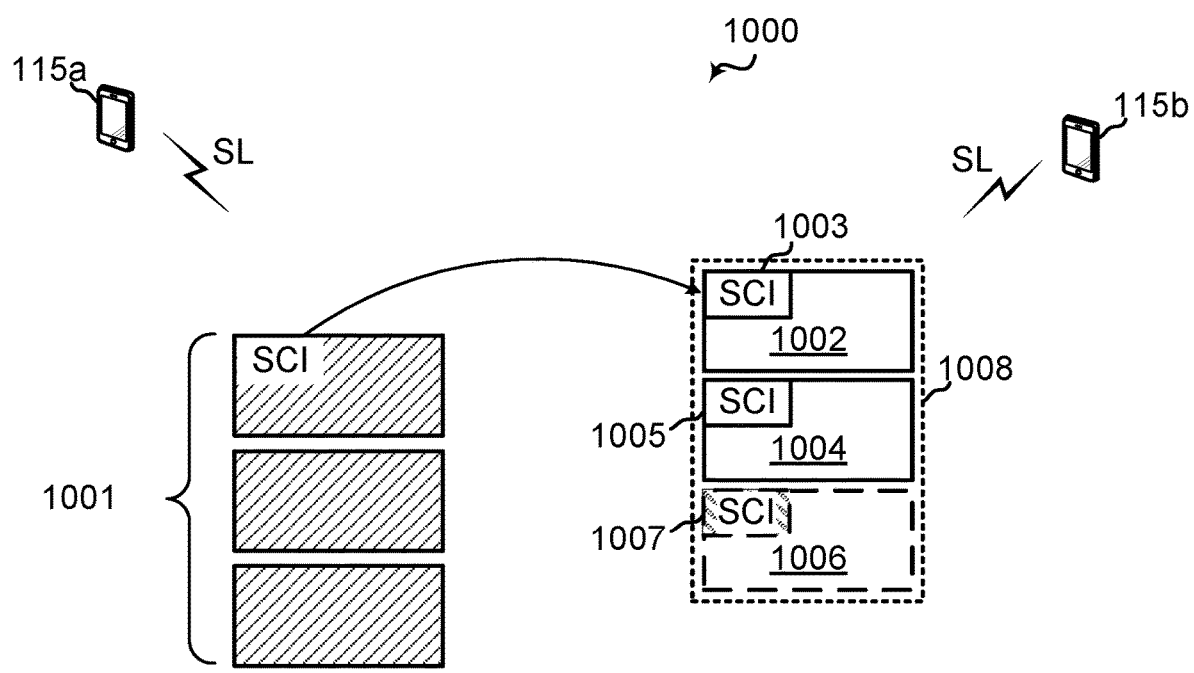
FIG. 10 is a block diagram illustrating a wireless communication network with UEs configured for providing an IM-based HARQ codebook over a sidelink feedback channel according to aspects of the present disclosure.

FIG. 10 is a block diagram illustrating wireless communication network 1000 with UEs 115a and 115b configured for providing an IM-based HARQ codebook over a sidelink feedback channel according to aspects of the present disclosure. UE 115a transmits a sidelink data burst at data channels 1002, 1004, and 1006, each including a corresponding SCI, SCI 1003, 1005, and 1007. UE 115b fails to successfully decode data channel 1006 and SCI 1007. The composite FDRA of the concurrent sidelink transmission of data channels 1002 and 1004 can be indicated by carrying a frequency indicator value in a two-stage SCI of each of data channels 1002 and 1004. SCI 1001, which reserves the three-sub-channel sidelink transmission of data channels 1002, 1004, and 1006, using the same mechanism specified in Rel-16 for frequency domain reservation.

For this purpose, UE 115*b* may carry a $\lfloor \log 2(N_{subChannel}^{SL}(N_{subChannel}^{SL}+1)/2) \rfloor$-bit frequency indicator value in the sidelink control channel to indicate the FDRA of the sidelink transmissions of data channels 1002, 1004, and 1006. The same frequency indicator value can also be carried by each of SCIs 1003, 1005, and 1007 of the three concurrent PSSCHs, data channels 1002, 1004, 1006. After receiving and successfully decoding SCI 1003 and 1005, UE 115*b* can learn the composite FDRA of the concurrent PSSCHs of data channels 1002, 1004, and 1005, and then know the pool of sidelink feedback resources for the HARQ codebook.

The number of bits for the frequency indicator value can be reduced if UE 115*a* is constrained to perform concurrent transmission of sidelink transmissions via data channels 1002 and 1004 within $A<N_{subChannel}^{SL}$ subchannels. Under this condition, the composite FDRA can be encoded with $\lfloor \log 2(W(W+1)/2)) \rfloor$, with $W=2*A-1$. With this design, SCIs of the concurrent sidelink transmission via data channels 1002 and 1004 may carry respective frequency indicator values.

It should be noted that the indication of joint PSFCH resources discussed above with respect to FIGS. 9 and 10 can be used to transmit a regular, non-IM-based HARQ codebook response or an IM-based HARQ codebook response.

It is noted that one or more blocks (or operations) described with reference to FIGS. 4 and 9 may be combined with one or more blocks (or operations) described with reference to another of the figures. For example, one or more blocks (or operations) of FIG. 5 may be combined with one or more blocks (or operations) of FIG. 6. As another example, one or more blocks associated with FIG. 7 may be combined with one or more blocks associated with FIG. 8. As another example, one or more blocks associated with FIG. 9 may be combined with one or more blocks (or operations) associated with FIGS. 1-3, and 11. Additionally, or alternatively, one or more operations described above with reference to FIGS. 1-3 may be combined with one or more operations described with reference to FIG. 11.

In one or more aspects, techniques for supporting an index modulation-based HARQ codebook over a sidelink feedback channel may include additional aspects, such as any single aspect or any combination of aspects described below or in connection with one or more other processes or devices described elsewhere herein. In one or more aspects, supporting an index modulation-based HARQ codebook over a sidelink feedback channel may include a first UE configured to receive at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set. The first UE is further configured to determine a feedback message sequence for the at least one IM-based feedback message codebook for the at least one sidelink transmission, wherein the feedback message sequence includes an ACK/NACK for each of the at least one sidelink transmission and determine, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence. The first UE may then transmit the at least one IM-based feedback message codebook on the determined PSFCH resource to the second UE over the sidelink.

In one or more aspects, supporting an index modulation-based HARQ codebook over a sidelink feedback channel may include a first UE configured to receive at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE, wherein the feedback message codebook includes a feedback response for the at least one sidelink transmission, and wherein each PSFCH resource pool of the plurality of PSFCH resource pools is associated with a sub-channel in which a sidelink transmission of the at least one sidelink transmission is received from the second UE, the first UE may further be configured to determine, based on the indication in the at least one SCI message, a PSFCH resource from the plurality of PSFCH resource pools in which to transmit the feedback message codebook and then transmit the feedback message codebook on the determined PSFCH resource to the second UE over the sidelink.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

A first aspect of wireless communication may include receiving, by a first UE, at least one sidelink transmission over a plurality of sub-channels of a sidelink from a second UE, wherein at least one SCI message from the second UE indicates to the first UE to transmit at least one I)-based feedback message codebook for the at least one sidelink transmission over a PSFCH resource, and wherein each sub-channel of the plurality of sub-channels is associated with at least one legacy PSFCH resource set; determining a feedback message sequence for the at least one IM-based feedback message codebook for the at least one sidelink transmission, wherein the feedback message sequence includes an ACK/NACK for each of the at least one sidelink transmission; determining, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence; and transmitting the at least one IM-based feedback message codebook on the determined PSFCH resource to the second UE over the sidelink.

In a second aspect, alone or in combination with the first aspect, wherein the at least one SCI message includes a single SCI message indicating that the at least one sidelink transmission includes a single TB for the at least one sidelink transmission transmitted over the plurality of sub-channels, wherein the single SCI message includes a one-bit indication to the first UE to transmit the at least one IM-based feedback message codebook for the at least one sidelink transmission.

In a third aspect, alone or in combination with the second aspect or the first aspect, wherein one or more of a size of the at least one IM-based feedback message codebook or a number of sub-channels in the plurality of sub-channels is determined based on a previously received control signal.

In a fourth aspect, alone or in combination with the first aspect through the third aspect, wherein a maximum size for each of the at least one IM-based feedback message codebook is defined by a previously received control signal.

In a fifth aspect, alone or in combination with the first aspect through the fourth aspect, wherein the at least one SCI message includes a plurality of SCI messages, each SCI message of the plurality of SCI messages corresponding to a sidelink transmission of the at least one sidelink transmission, and wherein each SCI message of the plurality of SCI messages requests a one-bit feedback response for the corresponding sidelink transmission from the first UE.

In a sixth aspect, alone or in combination with the first aspect through the fifth aspect, wherein each SCI message of the plurality of SCI messages indicates a PSFCH resource pool associated with the corresponding sidelink transmission, and wherein the PSFCH resource pool is a set of PSFCH resources corresponding to the union of legacy PSFCH resource sets associated with each sub-channel of the plurality of sub-channels.

In a seventh aspect, alone or in combination with the first aspect through the sixth aspect, wherein the first UE is configured with periodic PSFCH resources having a first periodicity, wherein the at least one SCI message indicates to the first UE to transmit a semi-static IM-based feedback message codebook having a first size in each periodic occurrence of the PSFCH resources, the first size equal corresponding to the first periodicity, and wherein the at least one sidelink transmission includes a first TB received in a first slot and a second TB received in a second slot subsequent to the first slot.

In an eighth aspect, alone or in combination with the first aspect through the seventh aspect, wherein the first size of the semi-static IM-based feedback message codebook is independent of a number of the at least one sidelink transmission received from the second UE.

In a ninth aspect, alone or in combination with the first aspect through the eighth aspect, wherein the at least one SCI message indicates to the first UE to transmit the semi-static IM-based feedback message codebook over a PSFCH resource of the at least one legacy PSFCH resource set associated with each sub-channel of the plurality of sub-channels in which the at least one sidelink transmission is received from the second UE.

In a tenth aspect, alone or in combination with the first aspect through the ninth aspect, wherein the at least one sidelink transmission includes a plurality of sidelink transmissions concurrently received within a single slot, and wherein the at least one SCI message indicates to the first UE to transmit a dynamic IM-based feedback message codebook associated with the plurality of sidelink transmissions concurrently received.

In an eleventh aspect, alone or in combination with the first aspect through the tenth aspect, wherein each SCI message of the plurality of SCI messages includes one or more of, a codepoint indicating a number of the plurality of sidelink transmissions concurrently received within the single slot, or an index of a current sub-channel within a composite FDRA associated with the plurality of sidelink transmissions concurrently received.

In a twelfth aspect, alone or in combination with the first aspect through the eleventh aspect, wherein determining the PSFCH resource in which to transmit the at least one IM-based feedback message codebook includes: determining, based on the composite FDRA associated with the at least one sidelink transmission, a PSFCH resource pool from which the PSFCH resource in which to transmit the at least one IM-based feedback message codebook to the second UE is to be selected, wherein the PSFCH resource pool is based on the at least one legacy PSFCH resource set associated with each sub-channel of the plurality of sub-channels; and determining the PSFCH resource in which to transmit the at least one IM-based feedback message codebook by selecting the PSFCH resource in which to transmit the at least one IM-based feedback message codebook from the PSFCH resource pool.

In a thirteenth aspect, alone or in combination with the first aspect through the twelfth aspect, wherein the feedback message codebook includes a feedback message that includes one or more of: a HARQ feedback message; a CSI feedback message; or a SR feedback message.

A fourteenth aspect configured for wireless communication may include receiving, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE; determining, based on the indication in the at least one SCI message, a PSFCH resource from the plurality of PSFCH resource pools in which to transmit the feedback message codebook; and transmitting the feedback message codebook on the determined PSFCH resource to the second UE over the sidelink.

In a fifteenth aspect, alone or in combination with the fourteenth aspect, wherein determining the PSFCH resource from the plurality of PSFCH resource pools in which to transmit the feedback message codebook includes: determining the PSFCH resource based on the indication of the plurality of PSFCH resource pools in a last received SCI message of the at least one SCI message.

In a sixteenth aspect, alone or in combination with one or more of the fourteenth aspect or the fifteenth aspect, wherein the last received SCI message is an SCI message successfully received subsequent to a lost SCI message of the at least one SCI message.

In a seventeenth aspect, alone or in combination with one or more of the fourteenth aspect through the sixteenth aspect, wherein the at least one sidelink transmission includes a plurality of sidelink transmissions concurrently received in a plurality of sub-channels within a single slot, and wherein the at least one SCI message includes a plurality of SCI messages associated with the plurality of sidelink transmissions concurrently received.

In an eighteenth aspect, alone or in combination with one or more of the fourteenth aspect through the seventeenth aspect, wherein each SCI message of the plurality of SCI messages includes one or more of; a codepoint indicating a number of the plurality of sidelink transmissions concurrently received within the single slot; or an index of a current sub-channel within a composite FDRA associated with the plurality of sidelink transmissions concurrently received.

In a nineteenth aspect, alone or in combination with one or more of the fourteenth aspect through the eighteenth aspect, wherein determining the PSFCH resource from the plurality of PSFCH resource pools in which to transmit the feedback message codebook includes: determining, based on the composite FDRA associated with the plurality of sidelink transmissions concurrently received, a PSFCH resource pool from which the PSFCH resource in which to transmit the feedback message codebook to the second UE is to be selected; and determining the PSFCH resource in which to transmit the feedback message codebook by selecting the PSFCH resource in which to transmit the feedback message codebook from the PSFCH resource pool.

In a twentieth aspect, alone or in combination with one or more of the fourteenth aspect through the nineteenth aspect, wherein determining, based on the composite FDRA associated with the plurality of sidelink transmissions concurrently received, the PSFCH resource pool includes: receiving, prior to concurrently receiving the plurality of sidelink transmissions, at least one first-stage SCI message reserving, at the first UE, resources for concurrently receiving over the plurality of sub-channels the plurality of sidelink transmissions within the single slot; reserving, based on the at least one first-stage SCI message, the resources for concurrently receiving over the plurality of sub-channels the plurality of sidelink transmissions within the single slot; receiving, concurrently within the single slot, the plurality of sidelink transmissions over the plurality of sub-channels; extracting, from at least one of the plurality of sidelink transmissions, a frequency indicator value, wherein each sidelink transmission of the plurality of sidelink transmissions includes a respective frequency indicator value; and determining, based on the frequency indicator value, the composite FDRA associated with the plurality of sidelink transmissions concurrently received.

In a twenty-first aspect, alone or in combination with one or more of the fourteenth aspect through the twentieth aspect, wherein a number of bits of the frequency indicator value is determined based on $\lfloor \log 2(N_{subChannel}^{SL}(N_{subChannel}^{SL}+1)/2) \rfloor$, wherein $N_{subChannel}$ indicates a number of the sub-channels in the plurality of sub-channels.

In a twenty-second aspect, alone or in combination with one or more of the fourteenth aspect through the twenty-first aspect, wherein the plurality of sub-channels over which the plurality of sidelink transmission is received is less than a number of sub-channels configured for the second UE.

In a twenty-third aspect, alone or in combination with one or more of the fourteenth aspect through the twenty-second aspect, wherein the respective frequency indicator value carried by each sidelink transmission of the plurality of sidelink transmissions is one of
  a copy of the frequency indicator value; or a value associated with the respective sidelink transmission over a sub-channel.

In a twenty-fourth aspect, alone or in combination with one or more of the fourteenth aspect through the twenty-third aspect, wherein the feedback message codebook is one or more of: a type-2 feedback message codebook; or an IM-based feedback message codebook.

In a twenty-fifth aspect, alone or in combination with one or more of the fourteenth aspect through the twenty-fourth aspect, wherein the feedback message codebook includes a feedback message that includes one or more of: a HARQ feedback message; a CSI feedback message; or a SR feedback message.

A twenty-sixth aspect configured for wireless communication includes at least one processor; and a memory coupled to the at least one processor, wherein the at least one processor is configured to receive, by the first UE, at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set; to determine a feedback message sequence for the at least one IM-based feedback message codebook for the at least one sidelink transmission, wherein the feedback message sequence includes an ACK/NACK for each of the at least one sidelink transmission; to determine, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence; and to transmit the at least one IM-based feedback message codebook on the determined PSFCH resource to the second UE over the sidelink.

In a twenty-seventh aspect, alone or in combination with the twenty-sixth aspect, wherein the at least one SCI message includes a single SCI message indicating that the at least one sidelink transmission includes a single TB for the at least one sidelink transmission transmitted over the plurality of sub-channels, wherein the single SCI message includes a one-bit indication to the first UE to transmit the at least one IM-based feedback message codebook for the at least one sidelink transmission.

In a twenty-eighth aspect, alone or in combination with the twenty-sixth aspect or the twenty-seventh aspect, wherein one or more of a size of the at least one IM-based feedback message codebook or a number of sub-channels in the plurality of sub-channels is determined based on a previously received control signal.

In a twenty-ninth aspect, alone or in combination with twenty-sixth aspect through the twenty-eighth aspect, wherein a maximum size for each of the at least one IM-based feedback message codebook is defined by a previously received control signal.

In a thirtieth aspect, alone or in combination with twenty-sixth aspect through the twenty-ninth aspect, wherein the at least one SCI message includes a plurality of SCI messages, each SCI message of the plurality of SCI messages corresponding to a sidelink transmission of the at least one sidelink transmission, and wherein each SCI message of the plurality of SCI messages requests a one-bit feedback response for the corresponding sidelink transmission from the first UE.

In a thirty-first aspect, alone or in combination with twenty-sixth aspect through the thirtieth aspect, wherein each SCI message of the plurality of SCI messages indicates a PSFCH resource pool associated with the corresponding sidelink transmission, and wherein the PSFCH resource pool is a set of PSFCH resources corresponding to the union of legacy PSFCH resource sets associated with each sub-channel of the plurality of sub-channels.

In a thirty-second aspect, alone or in combination with twenty-sixth aspect through the thirty-first aspect, wherein the first UE is configured with periodic PSFCH resources having a first periodicity, wherein the at least one SCI message indicates to the first UE to transmit a semi-static IM-based feedback message codebook having a first size in each periodic occurrence of the PSFCH resources, the first size equal corresponding to the first periodicity, and wherein the at least one sidelink transmission includes a first TB received in a first slot and a second TB received in a second slot subsequent to the first slot.

In a thirty-third aspect, alone or in combination with twenty-sixth aspect through the thirty-second aspect, wherein the first size of the semi-static IM-based feedback message codebook is independent of a number of the at least one sidelink transmission received from the second UE.

In a thirty-fourth aspect, alone or in combination with twenty-sixth aspect through the thirty-third aspect, wherein the at least one SCI message indicates to the first UE to transmit the semi-static IM-based feedback message codebook over a PSFCH resource of the at least one legacy PSFCH resource set associated with each sub-channel of the plurality of sub-channels in which the at least one sidelink transmission is received from the second UE.

In a thirty-fifth aspect, alone or in combination with twenty-sixth aspect through the thirty-fourth aspect, wherein the at least one sidelink transmission includes a plurality of sidelink transmissions concurrently received within a single slot, and wherein the at least one SCI message indicates to the first UE to transmit a dynamic IM-based feedback message codebook associated with the plurality of sidelink transmissions concurrently received.

In a thirty-sixth aspect, alone or in combination with twenty-sixth aspect through the thirty-fifth aspect, wherein each SCI message of the plurality of SCI messages includes one or more of: a codepoint indicating a number of the plurality of sidelink transmissions concurrently received within the single slot; or an index of a current sub-channel within a composite FDRA associated with the plurality of sidelink transmissions concurrently received.

In a thirty-seventh aspect, alone or in combination with twenty-sixth aspect through the thirty-sixth aspect, wherein the configuration of the at least one processor to determine the PSFCH resource in which to transmit the at least one IM-based feedback message codebook includes the configuration of the at least one processor: to determine, based on the composite FDRA associated with the at least one sidelink transmission, a PSFCH resource pool from which the PSFCH resource in which to transmit the at least one IM-based feedback message codebook to the second UE is to be selected, wherein the PSFCH resource pool is based on the at least one legacy PSFCH resource set associated with each sub-channel of the plurality of sub-channels; and to determine the PSFCH resource in which to transmit the at least one IM-based feedback message codebook by selecting the PSFCH resource in which to transmit the at least one IM-based feedback message codebook from the PSFCH resource pool.

In a thirty-eighth aspect, alone or in combination with twenty-sixth aspect through the thirty-seventh aspect, wherein the feedback message codebook includes a feedback message that includes one or more of: a HARQ feedback message; a CSI feedback message; or a SR feedback message.

A thirty-ninth aspect configured for wireless communication includes at least one processor; and a memory coupled to the at least one processor, wherein the at least one processor is configured to receive, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE; to determine, based on the indication in the at least one SCI message, a PSFCH resource from the plurality of PSFCH resource pools in which to transmit the feedback message codebook; and to transmit the feedback message codebook on the determined PSFCH resource to the second UE over the sidelink.

In a fortieth aspect, alone or in combination with the thirty-ninth aspect, wherein the configuration of the at least one processor to determine the PSFCH resource from the plurality of PSFCH resource pools in which to transmit the feedback message codebook includes the configuration of the at least one processor: to determine the PSFCH resource based on the indication of the plurality of PSFCH resource pools in a last received SCI message of the at least one SCI message.

In a forty-first aspect, alone or in combination with the thirty-ninth aspect or the fortieth aspect, wherein the last received SCI message is an SCI message successfully received subsequent to a lost SCI message of the at least one SCI message.

In a forty-second aspect, alone or in combination with the thirty-ninth aspect through the forty-first aspect, wherein the at least one sidelink transmission includes a plurality of sidelink transmissions concurrently received in a plurality of sub-channels within a single slot, and wherein the at least one SCI message includes a plurality of SCI messages associated with the plurality of sidelink transmissions concurrently received.

In a forty-third aspect, alone or in combination with the thirty-ninth aspect through the forty-second aspect, wherein each SCI message of the plurality of SCI messages includes one or more of: a codepoint indicating a number of the plurality of sidelink transmissions concurrently received within the single slot; or an index of a current sub-channel within a composite FDRA associated with the plurality of sidelink transmissions concurrently received.

In a forty-fourth aspect, alone or in combination with the thirty-ninth aspect through the forty-third aspect, wherein the configuration of the at least one processor to determine the PSFCH resource from the plurality of PSFCH resource pools in which to transmit the feedback message codebook includes the configuration of the at least one processor: to determine, based on the composite FDRA associated with the plurality of sidelink transmissions concurrently received, a PSFCH resource pool from which the PSFCH resource in which to transmit the feedback message codebook to the second UE is to be selected; and to determine the PSFCH resource in which to transmit the feedback message codebook by selecting the PSFCH resource in which to transmit the feedback message codebook from the PSFCH resource pool.

In a forty-fifth aspect, alone or in combination with the thirty-ninth aspect through the forty-fourth aspect, wherein the configuration of the at least one processor to determine, based on the composite FDRA associated with the plurality of sidelink transmissions concurrently received, the PSFCH resource pool includes the configuration of the at least one processor: to receive, prior to concurrently receiving the plurality of sidelink transmissions, at least one first-stage SCI message reserving, at the first UE, resources for concurrently receiving over the plurality of sub-channels the plurality of sidelink transmissions within the single slot; to reserve, based on the at least one first-stage SCI message, the resources for concurrently receiving over the plurality of sub-channels the plurality of sidelink transmissions within the single slot; to receive, concurrently within the single slot, the plurality of sidelink transmissions over the plurality of sub-channels; to extract, from at least one of the plurality of sidelink transmissions, a frequency indicator value, wherein each sidelink transmission of the plurality of sidelink transmissions includes a respective frequency indicator value; and to determine, based on the frequency indicator value, the composite FDRA associated with the plurality of sidelink transmissions concurrently received.

In a forty-sixth aspect, alone or in combination with the thirty-ninth aspect through the forty-fifth aspect, wherein a number of bits of the frequency indicator value is determined based on $\lfloor \log 2(N_{subChannel}^{SL}(N_{subChannel}^{SL}+1)/2) \rfloor$, wherein ▩▩▩▩ indicates a number of the sub-channels in the plurality of sub-channels.

In a forty-seventh aspect, alone or in combination with the thirty-ninth aspect through the forty-sixth aspect, wherein the plurality of sub-channels over which the plurality of sidelink transmission is received is less than a number of sub-channels configured for the second UE.

In a forty-eighth aspect, alone or in combination with the thirty-ninth aspect through the forty-seventh aspect, wherein the respective frequency indicator value carried by each sidelink transmission of the plurality of sidelink transmissions is one of a copy of the frequency indicator value; or a value associated with the respective sidelink transmission over a sub-channel.

In a forty-ninth aspect, alone or in combination with the thirty-ninth aspect through the forty-eighth aspect, wherein the feedback message codebook is one or more of: a type-2 feedback message codebook; or an IM-based feedback message codebook.

In a fiftieth aspect, alone or in combination with the thirty-ninth aspect through the forty-ninth aspect, wherein the feedback message codebook includes a feedback message that includes one or more of: a HARQ feedback message; a CSI feedback message; or a SR feedback message.

A fifty-first aspect configured for wireless communication includes means for receiving, by first UE, at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set; means for determining a feedback message sequence for the at least one IM-based feedback message codebook for the at least one sidelink transmission, wherein the feedback message sequence includes an ACK/NACK for each of the at least one sidelink transmission; means for determining, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence, and means for transmitting the at least one IM-based feedback message codebook on the determined PSFCH resource to the second UE over the sidelink.

In a fifty-second aspect, alone or in combination with the fifty-first aspect, wherein the at least one SCI message includes a single SCI message indicating that the at least one sidelink transmission includes a single TB for the at least one sidelink transmission transmitted over the plurality of sub-channels, wherein the single SCI message includes a one-bit indication to the first UE to transmit the at least one IM-based feedback message codebook for the at least one sidelink transmission.

In a fifty-third aspect, alone or in combination with the fifty-first aspect or the fifty-second aspect, wherein one or more of a size of the at least one IM-based feedback message codebook or a number of sub-channels in the plurality of sub-channels is determined based on a previously received control signal.

In a fifty-fourth aspect, alone or in combination with the fifty-first aspect through the fifty-third aspect, wherein a maximum size for each of the at least one IM-based feedback message codebook is defined by a previously received control signal.

In a fifty-fifth aspect, alone or in combination with the fifty-first aspect through the fifty-fourth aspect, wherein the at least one SCI message includes a plurality of SCI messages, each SCI message of the plurality of SCI messages corresponding to a sidelink transmission of the at least one sidelink transmission, and wherein each SCI message of the plurality of SCI messages requests a one-bit feedback response for the corresponding sidelink transmission from the first UE.

In a fifty-sixty aspect, alone or in combination with the fifty-first aspect through the fifty-fifth aspect, wherein each SCI message of the plurality of SCI messages indicates a PSFCH resource pool associated with the corresponding sidelink transmission, and wherein the PSFCH resource pool is a set of PSFCH resources corresponding to the union of legacy PSFCH resource sets associated with each sub-channel of the plurality of sub-channels.

In a fifty-seventh aspect, alone or in combination with the fifty-first aspect through the fifty-sixty aspect, wherein the first UE is configured with periodic PSFCH resources having a first periodicity, wherein the at least one SCI message indicates to the first UE to transmit a semi-static IM-based feedback message codebook having a first size in each periodic occurrence of the PSFCH resources, the first size equal corresponding to the first periodicity, and wherein the at least one sidelink transmission includes a first TB received in a first slot and a second TB received in a second slot subsequent to the first slot.

In a fifty-eighth aspect, alone or in combination with the fifty-first aspect through the fifty-seventh aspect, wherein the first size of the semi-static IM-based feedback message codebook is independent of a number of the at least one sidelink transmission received from the second UE.

In a fifty-ninth aspect, alone or in combination with the fifty-first aspect through the fifty-eighth aspect, wherein the at least one SCI message indicates to the first UE to transmit the semi-static IM-based feedback message codebook over a PSFCH resource of the at least one legacy PSFCH resource set associated with each sub-channel of the plurality of sub-channels in which the at least one sidelink transmission is received from the second UE.

In a sixtieth aspect, alone or in combination with the fifty-first aspect through the fifty-ninth aspect, wherein the at least one sidelink transmission includes a plurality of sidelink transmissions concurrently received within a single slot, and wherein the at least one SCI message indicates to the first UE to transmit a dynamic IM-based feedback message codebook associated with the plurality of sidelink transmissions concurrently received.

In a sixty-first aspect, alone or in combination with the fifty-first aspect through the sixtieth aspect, wherein each SCI message of the plurality of SCI messages includes one or more of: a codepoint indicating a number of the plurality of sidelink transmissions concurrently received within the single slot; or an index of a current sub-channel within a composite FDRA associated with the plurality of sidelink transmissions concurrently received.

In a sixty-second aspect, alone or in combination with the fifty-first aspect through the sixty-first aspect, wherein means for determining the PSFCH resource in which to transmit the at least one IM-based feedback message codebook includes: means for determining, based on the composite FDRA associated with the at least one sidelink transmission, a PSFCH resource pool from which the PSFCH resource in which to transmit the at least one IM-based feedback message codebook to the second UE is to be selected, wherein the PSFCH resource pool is based on the at least one legacy PSFCH resource set associated with each sub-channel of the plurality of sub-channels; and means for determining the PSFCH resource in which to transmit the at least one IM-based feedback message codebook by selecting the PSFCH resource in which to transmit the at least one IM-based feedback message codebook from the PSFCH resource pool.

In a sixty-third aspect, alone or in combination with the fifty-first aspect through the sixty-second aspect, wherein the feedback message codebook includes a feedback message that includes one or more of: a HARQ feedback message; a CSI feedback message; or a SR feedback message.

A sixty-fourth aspect configured for wireless communication, comprising: means for receiving, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE; means for determining, based on the indication in the at least one SCI message, a PSFCH resource from the plurality of PSFCH resource pools in which to transmit the feedback message codebook; and means for transmitting the feedback message codebook on the determined PSFCH resource to the second UE over the sidelink.

In a sixty-fifth aspect, alone or in combination with the sixty-fourth aspect, wherein means for determining the PSFCH resource from the plurality of PSFCH resource pools in which to transmit the feedback message codebook includes: means for determining the PSFCH resource based on the indication of the plurality of PSFCH resource pools in a last received SCI message of the at least one SCI message.

In a sixty-sixth aspect, alone or in combination with the sixty-fourth aspect or the sixty-fifth aspect, wherein the last received SCI message is an SCI message successfully received subsequent to a lost SCI message of the at least one SCI message.

In a sixty-seventh aspect, alone or in combination with the sixty-fourth aspect through the sixty-sixth aspect, wherein the at least one sidelink transmission includes a plurality of sidelink transmissions concurrently received in a plurality of sub-channels within a single slot, and wherein the at least one SCI message includes a plurality of SCI messages associated with the plurality of sidelink transmissions concurrently received.

In a sixty-eighth aspect, alone or in combination with the sixty-fourth aspect through the sixty-seventh aspect, wherein each SCI message of the plurality of SCI messages includes one or more of: a codepoint indicating a number of the plurality of sidelink transmissions concurrently received within the single slot; or an index of a current sub-channel within a composite FDRA associated with the plurality of sidelink transmissions concurrently received.

In a sixty-ninth aspect, alone or in combination with the sixty-fourth aspect through the sixty-eighth aspect, wherein means for determining the PSFCH resource from the plurality of PSFCH resource pools in which to transmit the feedback message codebook includes: means for determining, based on the composite FDRA associated with the plurality of sidelink transmissions concurrently received, a PSFCH resource pool from which the PSFCH resource in which to transmit the feedback message codebook to the second UE is to be selected; and means for determining the PSFCH resource in which to transmit the feedback message codebook by selecting the PSFCH resource in which to transmit the feedback message codebook from the PSFCH resource pool.

In a seventieth aspect, alone or in combination with the sixty-fourth aspect through the sixty-ninth aspect, wherein means for determining, based on the composite FDRA associated with the plurality of sidelink transmissions concurrently received, the PSFCH resource pool includes: means for receiving, prior to concurrently receiving the plurality of sidelink transmissions, at least one first-stage SCI message reserving, at the first UE, resources for concurrently receiving over the plurality of sub-channels the plurality of sidelink transmissions within the single slot; means for reserving, based on the at least one first-stage SCI message, the resources for concurrently receiving over the plurality of sub-channels the plurality of sidelink transmissions within the single slot; means for receiving, concurrently within the single slot, the plurality of sidelink transmissions over the plurality of sub-channels; means for extracting, from at least one of the plurality of sidelink transmissions, a frequency indicator value, wherein each sidelink transmission of the plurality of sidelink transmissions includes a respective frequency indicator value; and means for determining, based on the frequency indicator value, the composite FDRA associated with the plurality of sidelink transmissions concurrently received.

In a seventy-first aspect, alone or in combination with the sixty-fourth aspect through the seventieth aspect, wherein a number of bits of the frequency indicator value is determined based on $\lfloor \log 2(N_{subChannel}^{SL}(N_{subChannel}^{SL}+1)/2) \rfloor$, wherein ▓▓▓ indicates a ▓▓▓ number of the sub-channels in the plurality of sub-channels.

In a seventy-second aspect, alone or in combination with the sixty-fourth aspect through the seventy-first aspect, wherein the plurality of sub-channels over which the plurality of sidelink transmission is received is less than a number of sub-channels configured for the second UE.

In a seventy-third aspect, alone or in combination with the sixty-fourth aspect through the seventy-second aspect, wherein the respective frequency indicator value carried by each sidelink transmission of the plurality of sidelink transmissions is one of: a copy of the frequency indicator value; or a value associated with the respective sidelink transmission over a sub-channel.

In a seventy-fourth aspect, alone or in combination with the sixty-fourth aspect through the seventy-third aspect, wherein the feedback message codebook is one or more of: a type-2 feedback message codebook; or an IM-based feedback message codebook.

In a seventy-fifth aspect, alone or in combination with the sixty-fourth aspect through the seventh-fourth aspect, wherein the feedback message codebook includes a feedback message that includes one or more of: a HARQ feedback message; a CSI feedback message; or a SR feedback message.

A seventy-sixth aspect includes a non-transitory computer-readable medium having program code recorded thereon, where the program code includes program code executable by a computer for causing the computer to receive, by the first UE, at least one sidelink transmission over a plurality of sub-channels of a sidelink from a second UE, wherein at least one SCI message from the second UE indicates to the first UE to transmit at least one IM-based feedback message codebook for the at least one sidelink transmission over a PSFCH resource, and wherein each sub-channel of the plurality of sub-channels is associated with at least one legacy PSFCH resource set; program code executable by the computer for causing the computer to determine a feedback message sequence for the at least one IM-based feedback message codebook for the at least one sidelink transmission, wherein the feedback message sequence includes an ACK/NACK for each of the at least one sidelink transmission; program code executable by the computer for causing the computer to determine, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence; and program code executable by the computer for causing the computer to transmit the at least one IM-based feedback message codebook on the determined PSFCH resource to the second UE over the sidelink.

In a seventy-seventh aspect, alone or in combination with the seventy-sixth aspect, wherein the at least one SCI message includes a single SCI message indicating that the at least one sidelink transmission includes a single TB for the at least one sidelink transmission transmitted over the plurality of sub-channels, wherein the single SCI message includes a one-bit indication to the first UE to transmit the at least one IM-based feedback message codebook for the at least one sidelink transmission.

In a seventy-eighth aspect, alone or in combination with the seventy-sixty aspect or the seventy-seventh aspect, wherein one or more of a size of the at least one IM-based feedback message codebook or a number of sub-channels in the plurality of sub-channels is determined based on a previously received control signal.

In a seventy-ninth aspect, alone or in combination with the seventy-sixth aspect through the seventy-eighth aspect, wherein a maximum size for each of the at least one IM-based feedback message codebook is defined by a previously received control signal.

In an eightieth aspect, alone or in combination with the seventy-sixth aspect through the seventy-ninth aspect, wherein the at least one SCI message includes a plurality of SCI messages, each SCI message of the plurality of SCI messages corresponding to a sidelink transmission of the at least one sidelink transmission, and wherein each SCI message of the plurality of SCI messages requests a one-bit feedback response for the corresponding sidelink transmission from the first UE.

In an eighty-first aspect, alone or in combination with the seventy-sixth aspect through the eightieth aspect, wherein each SCI message of the plurality of SCI messages indicates a PSFCH resource pool associated with the corresponding sidelink transmission, and wherein the PSFCH resource pool is a set of PSFCH resources corresponding to the union of legacy PSFCH resource sets associated with each sub-channel of the plurality of sub-channels.

In an eighty-second aspect, alone or in combination with the seventy-sixth aspect through the eighty-first aspect, wherein the first UE is configured with periodic PSFCH resources having a first periodicity, wherein the at least one SCI message indicates to the first UE to transmit a semi-static IM-based feedback message codebook having a first size in each periodic occurrence of the PSFCH resources, the first size equal corresponding to the first periodicity, and wherein the at least one sidelink transmission includes a first TB received in a first slot and a second TB received in a second slot subsequent to the first slot.

In an eighty-third aspect, alone or in combination with the seventy-sixth aspect through the eighty-second aspect, wherein the first size of the semi-static IM-based feedback message codebook is independent of a number of the at least one sidelink transmission received from the second UE.

In an eighty-fourth aspect, alone or in combination with the seventy-sixth aspect through the eighty-third aspect, wherein the at least one SCI message indicates to the first UE to transmit the semi-static IM-based feedback message codebook over a PSFCH resource of the at least one legacy PSFCH resource set associated with each sub-channel of the plurality of sub-channels in which the at least one sidelink transmission is received from the second UE.

In an eighty-fifth aspect, alone or in combination with the seventy-sixth aspect through the eighty-fourth aspect, wherein the at least one sidelink transmission includes a plurality of sidelink transmissions concurrently received within a single slot, and wherein the at least one SCI message indicates to the first UE to transmit a dynamic IM-based feedback message codebook associated with the plurality of sidelink transmissions concurrently received.

In an eighty-sixth aspect, alone or in combination with the seventy-sixth aspect through the eighty-fifth aspect, wherein each SCI message of the plurality of SCI messages includes one or more of: a codepoint indicating a number of the plurality of sidelink transmissions concurrently received within the single slot; or an index of a current sub-channel within a composite FDRA associated with the plurality of sidelink transmissions concurrently received.

In an eighty-seventh aspect, alone or in combination with the seventy-sixth aspect through the eighty-sixth aspect, wherein the program code executable by the computer for causing the computer to determine the PSFCH resource in which to transmit the at least one IM-based feedback message codebook includes: program code executable by the computer for causing the computer to determine, based on the composite FDRA associated with the at least one sidelink transmission, a PSFCH resource pool from which the PSFCH resource in which to transmit the at least one IM-based feedback message codebook to the second UE is to be selected, wherein the PSFCH resource pool is based on the at least one legacy PSFCH resource set associated with each sub-channel of the plurality of sub-channels; and program code executable by the computer for causing the computer to determine the PSFCH resource in which to transmit the at least one IM-based feedback message codebook by selecting the PSFCH resource in which to transmit the at least one IM-based feedback message codebook from the PSFCH resource pool.

In an eighty-eighth aspect, alone or in combination with the seventy-sixth aspect through the eighty-seventh aspect, wherein the feedback message codebook includes a feedback message that includes one or more of: a HARQ feedback message; a CSI feedback message; or a SR feedback message.

An eighty-ninth aspect includes a non-transitory computer-readable medium having program code recorded thereon, the program code includes program code executable by a computer for causing the computer to receive, by a first UE, at least one SCI message from a second UE, the least one SCI message associated with at least one sidelink transmission from the second UE to the first UE, wherein the at least one SCI message includes an indication of a plurality of PSFCH resource pools for transmitting a feedback message codebook for the at least one sidelink transmission to the second UE; program code executable by the computer for causing the computer to determine, based on the indication in the at least one SCI message, a PSFCH resource from the plurality of PSFCH resource pools in which to transmit the feedback message codebook; and program code executable by the computer for causing the computer to the feedback message codebook on the determined PSFCH resource to the second UE over the sidelink.

In a ninetieth aspect, alone or in combination with the eighty-ninth aspect, wherein the program code executable by the computer for causing the computer to determine the PSFCH resource from the plurality of PSFCH resource pools in which to transmit the feedback message codebook includes: program code executable by the computer for causing the computer to determine the PSFCH resource based on the indication of the plurality of PSFCH resource pools in a last received SCI message of the at least one SCI message.

In a ninety-first aspect, alone or in combination with the eighty-ninth aspect or the ninetieth aspect, wherein the last received SCI message is an SCI message successfully received subsequent to a lost SCI message of the at least one SCI message.

In a ninety-second aspect, alone or in combination with the eighty-ninth aspect through the ninety-first aspect, wherein the at least one sidelink transmission includes a plurality of sidelink transmissions concurrently received in a plurality of sub-channels within a single slot, and wherein the at least one SCI message includes a plurality of SCI messages associated with the plurality of sidelink transmissions concurrently received.

In a ninety-third aspect, alone or in combination with the eighty-ninth aspect through the ninety-second aspect, wherein each SCI message of the plurality of SCI messages includes one or more of: a codepoint indicating a number of the plurality of sidelink transmissions concurrently received within the single slot; or an index of a current sub-channel within a composite FDRA associated with the plurality of sidelink transmissions concurrently received.

In a ninety-fourth aspect, alone or in combination with the eighty-ninth aspect through the ninety-third aspect, wherein the program code executable by the computer for causing the computer to determine the PSFCH resource from the plurality of PSFCH resource pools in which to transmit the feedback message codebook includes: program code executable by the computer for causing the computer to determine, based on the composite FDRA associated with the plurality of sidelink transmissions concurrently received, a PSFCH resource pool from which the PSFCH resource in which to transmit the feedback message codebook to the second UE is to be selected; and program code executable by the computer for causing the computer to determine the PSFCH resource in which to transmit the feedback message codebook by selecting the PSFCH resource in which to transmit the feedback message codebook from the PSFCH resource pool.

In a ninety-fifth aspect, alone or in combination with the eighty-ninth aspect through the ninety-fourth aspect, wherein the program code executable by the computer for causing the computer to determine, based on the composite FDRA associated with the plurality of sidelink transmissions concurrently received, the PSFCH resource pool includes: program code executable by the computer for causing the computer to receive, prior to concurrently receiving the plurality of sidelink transmissions, at least one first-stage SCI message reserving, at the first UE, resources for concurrently receiving over the plurality of sub-channels the plurality of sidelink transmissions within the single slot; program code executable by the computer for causing the computer to reserve, based on the at least one first-stage SCI message, the resources for concurrently receiving over the plurality of sub-channels the plurality of sidelink transmissions within the single slot; program code executable by the computer for causing the computer to receive, concurrently within the single slot, the plurality of sidelink transmissions over the plurality of sub-channels; program code executable by the computer for causing the computer to extract, from at least one of the plurality of sidelink transmissions, a frequency indicator value, wherein each sidelink transmission of the plurality of sidelink transmissions includes a respective frequency indicator value; and program code executable by the computer for causing the computer to determine, based on the frequency indicator value, the composite FDRA associated with the plurality of sidelink transmissions concurrently received.

In a ninety-sixty aspect, alone or in combination with the eighty-ninth aspect through the ninety-fifth aspect, wherein a number of bits of the frequency indicator value is determined based on $\lfloor \log 2(N_{SubChannel}^{SL}(N_{subChannel}^{SL}+1)/2) \rfloor$, wherein $N_{subChannel}^{SL}$ indicates a number of the sub-channels in the plurality of sub-channels.

In a ninety-seventh aspect, alone or in combination with the eighty-ninth aspect through the ninety-sixty aspect, wherein the plurality of sub-channels over which the plurality of sidelink transmission is received is less than a number of sub-channels configured for the second UE.

In a ninety-eighth aspect, alone or in combination with the eighty-ninth aspect through the ninety-seventh aspect, wherein the respective frequency indicator value carried by each sidelink transmission of the plurality of sidelink transmissions is one of: a copy of the frequency indicator value; or a value associated with the respective sidelink transmission over a sub-channel.

In a ninety-ninth aspect, alone or in combination with the eighty-ninth aspect through the ninety-eighth aspect, wherein the feedback message codebook is one or more of: a type-2 feedback message codebook; or an IM-based feedback message codebook.

In a one hundredth aspect, alone or in combination with the eighty-ninth aspect through the ninety-ninth aspect, wherein the feedback message codebook includes a feedback message that includes one or more of: a HARQ feedback message; a CSI feedback message; or a SR feedback message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a first user equipment (UE), at least one sidelink transmission over a plurality of sub-channels of a sidelink from a second UE, wherein at least one sidelink control information (SCI) message from the second UE indicates to the first UE to transmit at least one index modulation (IM)-based feedback message codebook for the at least one sidelink transmission over a physical sidelink feedback channel (PSFCH) resource, and wherein each sub-channel of the plurality of sub-channels is associated with at least one legacy PSFCH resource set;
   determining a feedback message sequence for the at least one IM-based feedback message codebook for the at least one sidelink transmission, wherein the feedback message sequence includes an acknowledgement (ACK) or non-ACK (NACK) for each of the at least one sidelink transmission;
   determining, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence; and
   transmitting the at least one IM-based feedback message codebook on the determined PSFCH resource to the second UE over the sidelink.

2. The method of claim 1, wherein the at least one SCI message includes a single SCI message indicating that the at least one sidelink transmission includes a single transport block (TB) for the at least one sidelink transmission transmitted over the plurality of sub-channels, wherein the single SCI message includes a one-bit indication to the first UE to transmit the at least one IM-based feedback message codebook for the at least one sidelink transmission.

3. The method of claim 2, wherein one or more of a size of the at least one IM-based feedback message codebook or a number of sub-channels in the plurality of sub-channels is determined based on a previously received control signal.

4. The method of claim 2, wherein a maximum size for each of the at least one IM-based feedback message codebook is defined by a previously received control signal.

5. The method of claim 1, wherein the at least one SCI message includes a plurality of SCI messages, each SCI message of the plurality of SCI messages corresponding to a sidelink transmission of the at least one sidelink transmission, and wherein each SCI message of the plurality of SCI messages requests a one-bit feedback response for the corresponding sidelink transmission from the first UE.

6. The method of claim 5, wherein each SCI message of the plurality of SCI messages indicates a PSFCH resource pool associated with the corresponding sidelink transmission, and wherein the PSFCH resource pool is a set of PSFCH resources corresponding to a union of legacy PSFCH resource sets associated with each sub-channel of the plurality of sub-channels.

7. The method of claim 5, wherein the first UE is configured with periodic PSFCH resources having a first periodicity, wherein the at least one SCI message indicates to the first UE to transmit a semi-static IM-based feedback message codebook having a first size in each periodic occurrence of the PSFCH resources, the first size equal corresponding to the first periodicity, and wherein the at least one sidelink transmission includes a first transport block (TB) received in a first slot and a second TB received in a second slot subsequent to the first slot.

8. The method of claim 7, wherein the first size of the semi-static IM-based feedback message codebook is independent of a number of the at least one sidelink transmission received from the second UE.

9. The method of claim 7, wherein the at least one SCI message indicates to the first UE to transmit the semi-static IM-based feedback message codebook over a PSFCH resource of the at least one legacy PSFCH resource set associated with each sub-channel of the plurality of sub-channels in which the at least one sidelink transmission is received from the second UE.

10. The method of claim 5, wherein the at least one sidelink transmission includes a plurality of sidelink transmissions concurrently received within a single slot, and wherein the at least one SCI message indicates to the first UE to transmit a dynamic IM-based feedback message codebook associated with the plurality of sidelink transmissions concurrently received.

11. The method of claim 10, wherein each SCI message of the plurality of SCI messages includes one or more of:
   a codepoint indicating a number of the plurality of sidelink transmissions concurrently received within the single slot; or
   an index of a current sub-channel within a composite frequency domain resource assignment (FDRA) associated with the plurality of sidelink transmissions concurrently received.

12. The method of claim 11, wherein determining the PSFCH resource in which to transmit the at least one IM-based feedback message codebook includes:
   determining, based on the composite FDRA associated with the at least one sidelink transmission, a PSFCH resource pool from which the PSFCH resource in which to transmit the at least one IM-based feedback message codebook to the second UE is to be selected, wherein the PSFCH resource pool is based on the at least one legacy PSFCH resource set associated with each sub-channel of the plurality of sub-channels; and
   determining the PSFCH resource in which to transmit the at least one IM-based feedback message codebook by selecting the PSFCH resource in which to transmit the at least one IM-based feedback message codebook from the PSFCH resource pool.

13. The method of claim 1, wherein the feedback message codebook includes a feedback message that includes one or more of:
   a hybrid automatic repeat request (HARQ) feedback message;
   a channel station information (CSI) feedback message; or
   a scheduling request (SR) feedback message.

14. A method of wireless communication, comprising:
receiving, by a first user equipment (UE), at least one sidelink control information (SCI) message from a second UE, the at least one SCI message associated with at least one sidelink transmission from the second UE to the first UE, wherein the at least one SCI message includes an indication of a plurality of physical sidelink feedback channel (PSFCH) resource pools for transmitting a feedback message codebook for the at least one sidelink transmission to the second UE; determining, based on the indication in the at least one SCI message, a PSFCH resource from the plurality of PSFCH resource pools in which to transmit the feedback message codebook; and transmitting the feedback message codebook on the determined PSFCH resource to the second UE over the sidelink.

15. The method of claim 14, wherein determining the PSFCH resource from the plurality of PSFCH resource pools in which to transmit the feedback message codebook includes:
   determining the PSFCH resource based on the indication of the plurality of PSFCH resource pools in a last received SCI message of the at least one SCI message.

16. The method of claim 15, wherein the last received SCI message is an SCI message successfully received subsequent to a lost SCI message of the at least one SCI message.

17. The method of claim 14, wherein the at least one sidelink transmission includes a plurality of sidelink transmissions concurrently received in a plurality of sub-channels within a single slot, and wherein the at least one SCI message includes a plurality of SCI messages associated with the plurality of sidelink transmissions concurrently received.

18. The method of claim 17, wherein each SCI message of the plurality of SCI messages includes one or more of:
   a codepoint indicating a number of the plurality of sidelink transmissions concurrently received within the single slot; or
   an index of a current sub-channel within a composite frequency domain resource assignment (FDRA) associated with the plurality of sidelink transmissions concurrently received.

19. The method of claim 18, wherein determining the PSFCH resource from the plurality of PSFCH resource pools in which to transmit the feedback message codebook includes:
   determining, based on the composite FDRA associated with the plurality of sidelink transmissions concurrently received, a PSFCH resource pool from which the PSFCH resource in which to transmit the feedback message codebook to the second UE is to be selected; and
   determining the PSFCH resource in which to transmit the feedback message codebook by selecting the PSFCH resource in which to transmit the feedback message codebook from the PSFCH resource pool.

20. The method of claim 19, wherein determining, based on the composite FDRA associated with the plurality of sidelink transmissions concurrently received, the PSFCH resource pool includes:
   receiving, prior to concurrently receiving the plurality of sidelink transmissions, at least one first-stage SCI message reserving, at the first UE, resources for concurrently receiving over the plurality of sub-channels the plurality of sidelink transmissions within the single slot;
   reserving, based on the at least one first-stage SCI message, the resources for concurrently receiving over the plurality of sub-channels the plurality of sidelink transmissions within the single slot;
   receiving, concurrently within the single slot, the plurality of sidelink transmissions over the plurality of sub-channels;
   extracting, from at least one of the plurality of sidelink transmissions, a frequency indicator value, wherein each sidelink transmission of the plurality of sidelink transmissions includes a respective frequency indicator value; and
   determining, based on the frequency indicator value, the composite FDRA associated with the plurality of sidelink transmissions concurrently received.

21. The method of claim 20, wherein a number of bits of the frequency indicator value is determined based on $\lfloor \log 2(N_{subChannel}^{SL}(N_{subChannel}^{SL}+1)/2) \rfloor$, wherein indicates a number of the sub-channels in the plurality of sub-channels.

22. The method of claim 21, wherein the plurality of sub-channels over which the plurality of sidelink transmissions is received is less than a number of sub-channels configured for the second UE.

23. The method of claim 21, wherein the respective frequency indicator value carried by each sidelink transmission of the plurality of sidelink transmissions is one of
- a copy of the frequency indicator value; or
- a value associated with the respective sidelink transmission over a sub-channel.

24. The method of claim 14, wherein the feedback message codebook is one or more of:
- a type-2 feedback message codebook; or
- an index modulation (IM)-based feedback message codebook.

25. The method of claim 14, wherein the feedback message codebook includes a feedback message that includes one or more of:
- a hybrid automatic repeat request (HARQ) feedback message;
- a channel station information (CSI) feedback message; or
- a scheduling request (SR) feedback message.

26. A first user equipment (UE) configured for wireless communication, the first UE comprising:
  at least one processor; and
  a memory coupled to the at least one processor,
  wherein the at least one processor is configured:
    to receive, by the first UE, at least one sidelink transmission over a plurality of sub-channels of a sidelink from a second UE, wherein at least one sidelink control information (SCI) message from the second UE indicates to the first UE to transmit at least one index modulation (IM)-based feedback message codebook for the at least one sidelink transmission over a physical sidelink feedback channel (PSFCH) resource, and wherein each sub-channel of the plurality of sub-channels is associated with at least one legacy PSFCH resource set;
    to determine a feedback message sequence for the at least one IM-based feedback message codebook for the at least one sidelink transmission, wherein the feedback message sequence includes an acknowledgement (ACK) or non-ACK (NACK) for each of the at least one sidelink transmission;
    to determine, based on the determined feedback sequence, a PSFCH resource from the at least one legacy PSFCH resource set associated with each sub-channel of the plurality of sub-channels in which to transmit the at least one IM-based feedback message codebook, wherein a resource index of the determined PSFCH resource corresponds to the determined feedback message sequence; and
    to transmit the at least one IM-based feedback message codebook on the determined PSFCH resource to the second UE over the sidelink.

27. The first UE of claim 26, wherein the at least one SCI message includes a single SCI message indicating that the at least one sidelink transmission includes a single transport block (TB) for the at least one sidelink transmission transmitted over the plurality of sub-channels, wherein the single SCI message includes a one-bit indication to the first UE to transmit the at least one IM-based feedback message codebook for the at least one sidelink transmission.

28. The first UE of claim 26, wherein the at least one SCI message includes a plurality of SCI messages, each SCI message of the plurality of SCI messages corresponding to a sidelink transmission of the at least one sidelink transmission, and wherein each SCI message of the plurality of SCI messages requests a one-bit feedback response for the corresponding sidelink transmission from the first UE.

29. A first user equipment (UE) configured for wireless communication, the first UE comprising: at least one processor; and a memory coupled to the at least one processor, wherein the at least one processor is configured: to receive, by a first user equipment (UE), at least one sidelink control information (SCI) message from a second UE, the at least one SCI message associated with at least one sidelink transmission from the second UE to the first UE, wherein the at least one SCI message includes an indication of a plurality of physical sidelink feedback channel (PSFCH) resource pools for transmitting a feedback message codebook for the at least one sidelink transmission to the second UE; to determine, based on the indication in the at least one SCI message, a PSFCH resource from the plurality of PSFCH resource pools in which to transmit the feedback message codebook; and to transmit the feedback message codebook on the determined PSFCH resource to the second UE over the sidelink.

30. The first UE of claim 29, wherein the configuration of the at least one processor to determine the PSFCH resource from the plurality of PSFCH resource pools in which to transmit the feedback message codebook includes the configuration of the at least one processor:
  to determine the PSFCH resource based on the indication of the plurality of PSFCH resource pools in a last received SCI message of the at least one SCI message.

* * * * *